US010296999B2

United States Patent
Cai

(10) Patent No.: US 10,296,999 B2
(45) Date of Patent: *May 21, 2019

(54) METHODS AND APPARATUS FOR COLOR IMAGE WATERMARKING

(71) Applicant: Macau University of Science and Technology, Macau (CN)

(72) Inventor: Zhanchuan Cai, Macau (CN)

(73) Assignee: Macau University of Science and Technology, Macau (CN)

(*) Notice: Subject to any disclaimer, the term of this patent is extended or adjusted under 35 U.S.C. 154(b) by 140 days.

This patent is subject to a terminal disclaimer.

(21) Appl. No.: 15/431,739

(22) Filed: Feb. 13, 2017

(65) Prior Publication Data
US 2018/0232844 A1    Aug. 16, 2018

(51) Int. Cl.
*H04L 9/00*    (2006.01)
*G06T 1/00*    (2006.01)
*H04N 19/467*    (2014.01)
*H04N 1/32*    (2006.01)

(52) U.S. Cl.
CPC ....... *G06T 1/0021* (2013.01); *H04N 1/32144* (2013.01); *H04N 19/467* (2014.11); *G06T 2201/0053* (2013.01)

(58) Field of Classification Search
CPC ............. G06T 1/0021; G06T 2201/005; G06T 2201/0064; G06T 2207/20021; G06T 7/408; G06T 2201/0053; G06T 7/90
See application file for complete search history.

(56) References Cited

PUBLICATIONS

Pei-Yu Lin, Jung-San Lee, and Chin-Chen Chang, Protecting the content integrity of digital imagery with fidelity preservation, ACM Transactions on Multimedia Computing Communications and Applications 7 (3) (2011) 726-742.
A. A. Mohammad, A. Alhaj, and S. Shaltaf, An improved SVD-based watermarking scheme for protecting rightful ownership, Signal Processing 88 (9) (2008) 2158-2180.
Ning Bi, Qiyu Sun, Daren Huang, Zhihua Yang, and Jiwu Huang, Robust image watermarking based on multiband wavelets and empirical mode decomposition, Image Processing IEEE Transactions on 16 (8) (2007) 1956-1966.
H. Y. Yang, X. Y. Wang, P. P. Niu, and A. L. Wang, Robust color image watermarking using geometric invariant quaternion polar harmonic transform, ACM Transactions on Multimedia Computing Communications & Applications 11 (3) (2015) 1-26.

(Continued)

*Primary Examiner* — Ghazal B Shehni
(74) *Attorney, Agent, or Firm* — Eagle IP Limited; Jacqueline C. Lui

(57) ABSTRACT

A method embeds a watermark image into a host image with adaptive rectangular partition and Lower Upper (LU) decomposition such that a watermarked image is generated with improved computational complexity. The method divides a host image into an Red (R) component, a Green (G) component, and a Blue (B) component, and divides each component of the R, G, and B components into a plurality of M×M size blocks, and partitions each of the plurality of M×M size blocks into a plurality of non-overlapping blocks with adaptive rectangular partition. The method selects a plurality of embedding blocks from the plurality of M×M size blocks for each component of the R, G, and B components of the host image to embed watermark information such that the watermarked image is generated.

20 Claims, 15 Drawing Sheets
(11 of 15 Drawing Sheet(s) Filed in Color)

(56) References Cited

PUBLICATIONS

Q. Su, Y. Niu, G. Wang, S. Jia, and J. Yue, Color image blind watermarking scheme based on QR decomposition, Signal Processing 94 (1) (2014) 219-235.

M. Ali, and C.W. Ahn, An optimized watermarking technique based on self-adaptive DE in DWT-SVD transform domain, Signal Processing 94 (1) (2014) 545-556.

L. Chen, D. Zhao, and F. Ge, Gray images embedded in a color image and encrypted with FRFT and region shift encoding methods, Optics Communications 283 (10) (2010) 2043-2049.

W. J. Wang, W. Zuo, and X. M. Yan, New gray-scale watermarking algorithm of color images based on quaternion Fourier transform, Advanced Computational Intelligence IRD International Workshop on (2010) 593-596.

E. H. Golea, R. Seghir, and R. Benzid, A bind RGB color image watermarking based on singular value decomposition, Computer Systems and Applications, ACSIEEE International Conference on, 2010, pp. 1-5.

C. H. Chou, and T. L Wu, Embedding color watermarks in color images, Eurasip Journal on Advances in Signal Processing 2003 (1) (2003) 32-40.

I. J. Cox, J. Kilian, F. T. Leighton, and T. Shamoon, Secure spread spectrum watermarking for multimedia, IEEE Transactions on Image Processing vol. 6, No. 12, 1997.

M. Barni, F. Bartolini, V. Cappellini, and A. Piva, A DCT-domain system for robust image watermarking, Signal Processing 66 (3) (1998) 357-372.

S. Rawat, and B. Raman, A new robust watermarking scheme for color images, Advance Computing Conference (IACC), 2010 IEEE 2nd International, 2010, pp. 206-209.

A. Tremeau, and D. Muselet, Recent trends in color image watermarking, Journal of Imaging Science & Technology vol. 53 (1) (2009) 10201-10201(1).

J. Kintak, S. D. Hu, D. Qi, and Z. Tang, A robust image watermarking algorithm based on non-uniform rectangular partition and DWT, Power Electronics and Intelligent Transportation System (PEITS), 2009 2nd International Conference on, 2009, pp. 25-28.

J. Kintak, S. D. Hu, D. Qi, and Z. Tang, A robust image watermarking algorithm based on non-uniform rectangular partition and DCT-SVD, 2014 Sixth International Conference on Measuring Technology and Mechatronics Automation, 2010, pp. 327-330.

J. K. Tak, Z. Tang, and D. Qi,A non-uniform rectangular partition coding of digital image and its application, Information and Automation, ICIA. International Conference on, 2009, pp. 995-999.

Y. Xing, and J. Tan, A color watermarking scheme based on block-SVD and Arnold transformation, Digital Media and its Application in Museum Heritage Digital Media and its Application in Museum Heritage, Workshop on, 2007, pp. 3-8.

Q. Su, Y. Niu, X. Liu, and Y. Zhu, Embedding color watermarks in color images based on schur decomposition, Optics Communications 285 (7) (2012) 1792-1802.

Y. Naderahmadian, and S. Hosseini-Khayat, Fast watermarking based on QR decomposition in wavelet domain, Intelligent Information Hiding and Multimedia Signal Processing (IIH-MSP), 2010 Sixth International (2010) 127-130.

Q. Su, Y. Niu, X. Liu, and Y. Zhu, Embedding color watermarks in color images based on Schur decomposition, Optics Communications, vol. 285, Issue 7, Apr. 1, 2012, pp. 1792-1802.

Yashar Naderahmadian, and Saied Hosseini-Khayat, Fast Watermarking Based on QR Decomposition in Wavelet Domain, 2010 Sixth International Conference on Intelligent Information Hiding and Multimedia Signal Processing (IIH-MSP).

N. Golea, R. Seghir, and R. Benzid, A bind RGB color image watermarking based on singular value decomposition, AICCSA, p. 1-5. IEEE Computer Society, (2010).

Musrrat Ali, Chang Wook Ahn, and Millie Pant, An optimized watermarking technique based on DE in DWT-SVD domain, Signal Processing 94 (1) (2014) 545-556.

310 ⟶

320 ⟶

330 ⟶

410 →

420 →

430 →

500 ⤴

1: input $n, (a_{i,j})$
2: for $k = 1$ to $n$ do
3:   Specify a nonzero value for either
4:   $l_{k,k}$ or $u_{k,k}$ and compute the other from
5:   $l_{k,k} u_{k,k} = a_{k,k} - \sum_{s=1}^{k-1} l_{k,s} u_{k,s}$
6:   for $j = k + 1$ to $n$ do
7:     $u_{k,j} \leftarrow (a_{k,j} - \sum_{s=1}^{k-1} l_{k,s} u_{s,j})/l_{k,k}$
8:   end for
9:   for $i = k + 1$ to $n$ do
10:    $u_{i,k} \leftarrow (a_{i,k} - \sum_{s=1}^{k-1} l_{i,s} u_{s,k})/u_{k,k}$
11:   end for
12: end for
13: output $(l_{i,j}), (u_{i,j})$

1220

1230

1240

1300

| Method | Yashar | Su Schur | Su QR | Proposed Algorithm |
|---|---|---|---|---|
| Watermarked image (PSNR (db)) | 66.0058 | 39.9191 | 50.0839 | 92.0586 |
| Extracted watermark (NC) | 1.000 | 0.9863 | 1.000 | 1.000 |
| Watermarked image (PSNR (db)) | 66.8827 | 40.0559 | 50.0557 | 91.0308 |
| Extracted watermark (NC) | 1.000 | 0.6783 | 1.000 | 1.000 |
| Watermarked image (PSNR (db)) | 66.2208 | 40.1371 | 50.1611 | 89.7769 |
| Extracted watermark (NC) | 1.000 | 0.6112 | 1.000 | 1.000 |
| Watermarked image (PSNR (db)) | 65.8875 | 40.0480 | 49.9093 | 87.9714 |
| Extracted watermark (NC) | 1.000 | 0.6329 | 1.000 | 1.000 |

Figure 13

| Index | Attacks |
|---|---|
| 1 | Salt and pepper noise addition(0.02) |
| 2 | Salt and pepper noise addition(0.1) |
| 3 | Gaussian noise addition (5%) |
| 4 | Gaussian noise addition (8%) |
| 5 | JPEG compression(30) |
| 6 | JPEG compression(90) |
| 7 | JPEG 2000 compression(20) |
| 8 | JPEG 2000 compression(50) |
| 9 | Scaling(4) |
| 10 | Cropping (25%) |
| 11 | Cropping (50%) |

1700

| Arnold key KA | Right | Wrong | Right | Wrong |
|---|---|---|---|---|
| R List | Right | Right | Wrong | Wrong |
| Proposed Extracted watermark |  |  |  |  |

METHODS AND APPARATUS FOR COLOR IMAGE WATERMARKING

FIELD OF THE INVENTION

The present invention generally relates to image processing, and more particularly to methods and apparatus that provide color image watermarking.

BACKGROUND

With rapid development of the Internet, humans can easily access or distribute multimedia data across networks. Copyright security and protection of the data are becoming important issues. Digital watermarking has been proposed as a technology to ensure multimedia copyright protection. The technology uses a kind of marker to embed visually imperceptible yet electronically detectable signals or information into digital multimedia content, such as images, audios, and videos.

New methods and apparatus that assist in advancing technological needs and industrial applications in watermarking and digital watermarks are desirable.

SUMMARY OF THE INVENTION

One example embodiment is a method to embed a watermark image into a host image with adaptive rectangular partition and Lower Upper (LU) decomposition such that a watermarked image is generated with improved computational complexity. The example method divides a host image into an Red (R) component, a Green (G) component, and a Blue (B) component, and divides each component of the R, G, and B components into a plurality of M×M size blocks, and partitions each of the plurality of M×M size blocks into a plurality of non-overlapping blocks or sub areas with adaptive rectangular partition. The example method selects a plurality of embedding blocks from the plurality of M×M size blocks for each component of the R, G, and B components of the host image to embed watermark information such that the watermarked image is generated.

Other example embodiments are discussed herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 13 shows a table illustrating performance comparison between an example method in accordance with an example embodiment and three existing methods.

DETAILED DESCRIPTION

Figure 1:
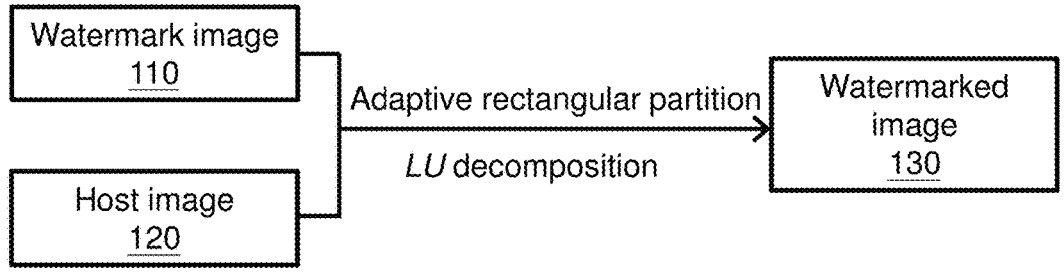
FIG. 1 shows a graph illustrating embedding a watermark image into a host image to obtain a watermarked image in accordance with an example embodiment.

Example embodiments relate to methods and apparatus that enable color watermark image embedding and extraction with improved performance.

Many existing or conventional color image watermarking methods or algorithms embed watermark information or data with the same intensity value into a host image. This type of method distorts the obtained watermarked image to a large extent. For example, due to different spatial frequencies, if watermark information is embedded into high frequency locations of a host image with high intensity, then imperceptibility will be reduced significantly. Existing methods or algorithms are also unsatisfactory in terms of robustness, invisibility, and computational complexity.

Example embodiments solve the above problems and provide technical solutions in new methods and apparatus that enable dual color image watermarking including digital watermark image embedding and extraction with improved performance, such as improved robustness, improved invisibility, and reduced computational complexity. Example embodiments solve technical problems rooted in image processing technology and information security field by providing digital watermarks that are used to verify the authenticity or integrity of a signal or an image and to verify the authenticity or identity of an owner of an image.

Example embodiments implement color image watermarking in unconventional ways by employing adaptive rectangular partition and Lower Upper (LU) decomposition to achieve improved computational complexity, strong imperceptible capability or imperceptibility, and strong robustness performance against attacks such as image compression. Example embodiments solve technical problems rooted in image processing technologies, and these example embodiments benefits a number of fields, such as intellectual property protection, information hiding, sensitive data security, etc. Example embodiments further benefits computer technology by reducing computational complexity such that images can be processed more efficiently, which reduces resource consumption such as memory usage and processing time. For example, contrasted with existing or prior art methods having computational complexity of $O(n^3)$, example embodiments present an improved computational complexity of $O(\frac{2}{3}n^3)$, where $O(\ )$ is a Big O notation. Example methods thus can be executed by a computer device or system with lower requirements for hardware to perform image embedding and extraction and thus mitigate demand of costly computers with expensive chips, memory, and other internal electronic components.

In an example embodiment, a host image is divided into a Red (R) component, a Green (G) component, and a Blue (B) component. Each component is divided into a plurality of M×M size blocks (such as 8×8 size blocks or other block sizes where M is a whole number greater than zero). Each of the plurality of M×M size blocks is adaptively partitioned into a plurality of non-overlapping blocks or sub regions or sub areas with adaptive rectangular partition. The partition results are used to calculate intensity values for each M×M size block of the host image, and watermark information or data is embedded into a plurality of selected embedding blocks after LU decomposition or LU factorization of each of the plurality of selected embedding blocks.

In an example embodiment, adaptive partition or adaptive rectangular partition or non-uniform partition or non-uniform subdivision treatment is obtained through calculating low frequency and polynomial approximation of a host image. Based on the obtained results of the adaptive partition, a plurality of non-uniform blocks in the host image are determined, and a plurality of embedding blocks that watermark information is to be embedded are selected. For each of the embedding blocks, LU decomposition is conducted to derive a matrix U that is an upper triangular matrix. Watermark information is embedded into the matrix U (such as the first row and the last or largest column of the matrix U) for each embedding block. An inverse LU operation is performed to obtain a watermarked block that corresponds to this embedding block.

For each component of R, G, and B components of a host image, when all embedding blocks for this component are converted into watermarked blocks, a watermarked component image is formed that includes these watermarked blocks. Three watermarked component images that correspond to the R, G, and B components of the host image are reconstructed such that a watermark image is embedded into the host image to obtain a watermarked image.

Example embodiments include methods that extract a watermark image from a watermarked image to obtain the watermark image. Example methods can extract a watermark image without knowing the original host image and the original watermark image.

Example embodiments includes apparatus or computer systems that execute methods in accordance with one or more example embodiments.

FIG. 1 shows a graph illustrating embedding a watermark image into a host image to obtain a watermarked image in accordance with an example embodiment. As shown, based on adaptive rectangular partition and LU decomposition, a watermark image 110 is embedded into a host image 120 to obtain a watermarked image 130.

By incorporating adaptive rectangular partition and LU decomposition, image gray scale distribution characteristics are taken into account to achieve better performance when embedding watermark information into a host image. By way of example, adaptive rectangular partition is conducted for a host image and intensity value is obtained according to image characteristics for the host image. Then watermark information is embedded into the host image with LU decomposition. In this way, better performance (such as improved robustness against noise and compression attacks, reduced computational complexity and stronger imperceptible capability) can be achieved.

Figure 2:
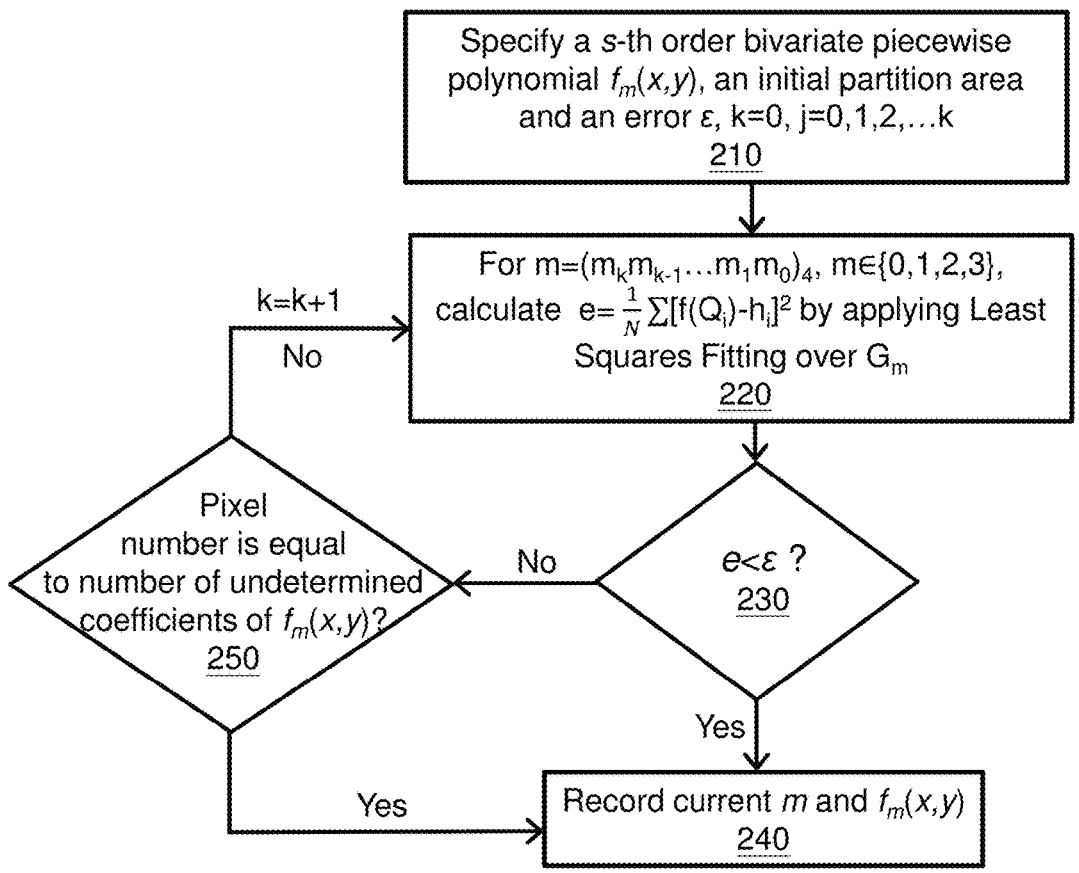
FIG. 2 shows a flow chart illustrating an adaptive rectangular partition process in accordance with an example embodiment.

FIG. 2 shows a flow chart illustrating an adaptive rectangular partition in accordance with an example embodiment. Example adaptive rectangular partition, or adaptive partition, or adaptive subdivision or non-uniform subdivision treatment, takes characteristics of an original image (such as a host image) into account, which overcomes prior art problems by avoiding distorting an obtained watermarked image.

Example methods as illustrated can be executed by a computer that incorporates software, hardware, and combinations of hardware and software. The computer includes electronic devices such as a computer system or electronic system, wearable electronic devices, servers, portable electronic devices, handheld portable electronic devices, and hardware (e.g., a processor, processing unit, digital signal processor, microprocessor, microcontroller, controller, application specific integrated circuit (ASIC), field programmable gate arrays (FPGAs), etc.).

Block 210 states specifying an s-th order bivariate piecewise polynomial $f_m(x,y)$, an initial partition area, and an error ε, k=0, j=0, 1, 2 . . . k.

In an example embodiment, the partition process starts from an initial partition area and carries on from bigger to smaller areas. By way of example, G represents an initial partition area or right rectangular area that can be partitioned into a number of non-overlapping blocks, or sub areas or sub regions. The area G has position information (x,y), width value (w) and height value (h). Sub regions or sub areas or non-overlapping blocks to be obtained with an adaptive rectangular partition are numbered following quadtree rule.

For example, m reprents sub region notation and is a whole number greater than zero. m can be written as $m=m_k4^k+m_{k-1}4^{k-1}+m_{k-2}4^{k-2}+\ldots+m_14^1+m_04^0$ or simply as $m=(m_k m_{k-1} m_{k-2} \ldots m_1 m_0)_4$. The s-th order bivariate piecewise polynomial over a sub area or non-overlapping block $G_m$ is expressed as:

$$f_m(P), P=(x,y) \in G_m$$

where $G_m$ includes a pixel set of $Q_i$ for sub region pixels, whose grey values are represented as $h_i$.

Block 220 states for $m=(m_k m_{k-1} m_{k-2} \ldots m_1 m_0)_4$, $m \in \{0, 1, 2, 3\}$, calculating $$e = \frac{1}{N} \sum [f(Q_i) - h_i]^2$$

by applying Least Squares Fitting over $G_m$, where N is the number of pixels within the sub area $G_m$.

Block 230 determines whether $e < \varepsilon$ is satisfied, where E is a selective error control value or simply called an error.

If $e < \varepsilon$ is satisfied at block 230, which indicates there is no need to carry on further partition and the partition process is completed, steps go to block 240 where current m and $f_m(x,y)$ are recorded or stored.

If $e < \varepsilon$ is unsatisfied at block 230, steps go to block 250 where it is determined whether the number of pixels or pixel number is equal to the number of undetermined coefficients of the bivariate piecewise polynomial $f_m(x,y)$.

If the pixel number is equal to the number of undetermined coefficients of the bivariate piecewise polynomial $f_m(x,y)$, steps go to block 240 where current m and $f_m(x,y)$ are recorded or stored. Otherwise, k is increased by 1, namely $k=k+1$, and steps return to block 220 such that the partition process is conducted recursively or iteratively.

By way of example, the coefficients or parameters of $f_m(P)$ can be obtained from adaptive codes of a digital image. Data or results such as position information (x,y), width value (w) and height value (h) for sub regions during a partition process are stored as X, Y, W, H respectively, which are further stored into an array RNO or RNO(r,g,b).

By way of example, various forms can be used to define the bivariate piecewise polynomial $f_m(P)$. As an example, $f(x,y)=ax+by+cxy+d$. As another example, $f(x,y)=ax^2+by^2+cxy+dx+ey+f$. A person of ordinary skill in the art would appreciate that the forms of $f(x,y)$ as stated are for illustrative purpose only, and other forms, such as bi-quadratic, cubic, and bi-cubic equations forms, can be used as well.

Figure 3A:
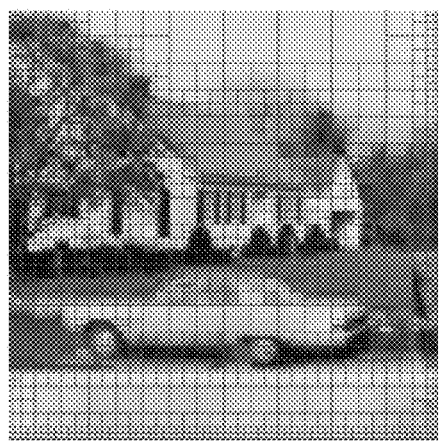
FIG. 3A shows an image after adaptive rectangular partition with ε=16 in accordance with an example embodiment.
Figure 3B:
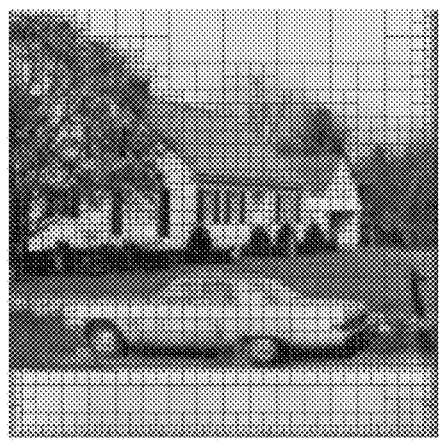
FIG. 3B shows an image after adaptive rectangular partition with ε=10 in accordance with an example embodiment.
Figure 3C:
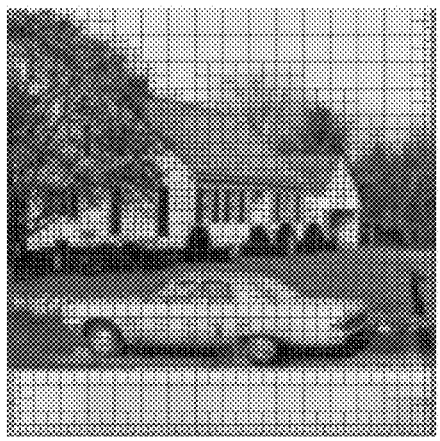
FIG. 3C shows an image after adaptive rectangular partition with ε=7 in accordance with an example embodiment.

FIG. 3A shows an image 310 after adaptive rectangular partition with $\varepsilon=16$ in accordance with an example embodiment. FIG. 3B shows an image 320 after adaptive rectangular partition with $\varepsilon=10$ in accordance with an example embodiment. FIG. 3C shows an image 330 after adaptive rectangular partition with $\varepsilon=7$ in accordance with an example embodiment. The images 310-330 have a size of 512×512 for illustrative purpose. As shown, when the selective error control value E becomes smaller, the number of sub areas or sub regions becomes larger.

Figure 4A:
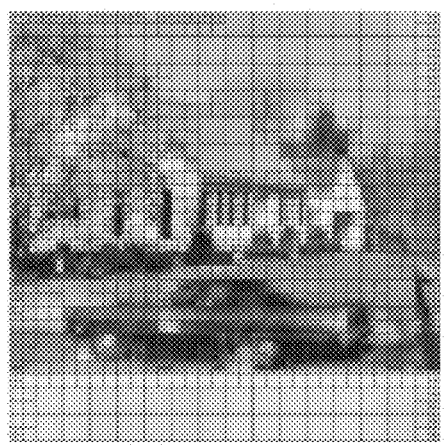
FIG. 4A shows an R component of a host image after adaptive rectangular partition in accordance with an example embodiment.
Figure 4B:
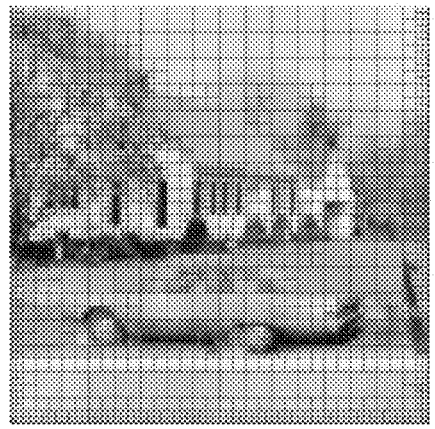
FIG. 4B shows a G component of a host image after adaptive rectangular partition in accordance with an example embodiment.
Figure 4C:
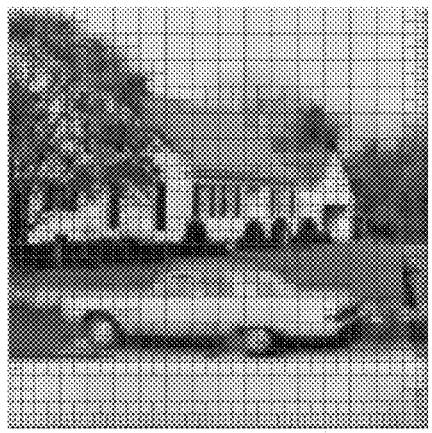
FIG. 4C shows a B component of a host image after adaptive rectangular partition in accordance with an example embodiment.

FIG. 4A shows an R component 410 of a host image after adaptive rectangular partition in accordance with an example embodiment. FIG. 4B shows a G component 420 of a host image after adaptive rectangular partition in accordance with an example embodiment. FIG. 4C shows a B component 430 of a host image after adaptive rectangular partition in accordance with an example embodiment.

FIGS. 4A-4C use an image as an illustrative example. As shown, the image is a color image that is divided into the R component 410, the G component 420, and the B component 430.

Figures 5, 6:
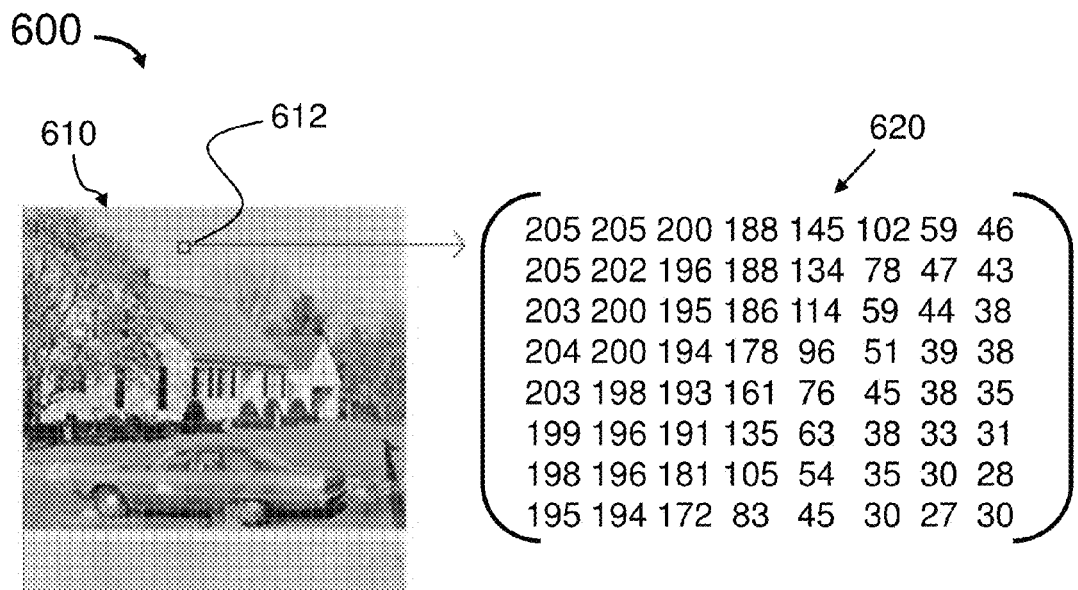
FIG. 5 shows a table illustrating LU decomposition in accordance with an example embodiment.
FIG. 6 shows a graph illustrating LU decomposition of a block in an image in accordance with an example embodiment.

FIG. 5 shows a table 500 illustrating LU decomposition in accordance with an example embodiment.

For example, with LU decomposition or LU factorization, a matrix A is decomposed as multiplication of two matrices L and U as follows:

$$A = LU \quad (1)$$

where the matrix L is a lower triangular matrix and the matrix U is an upper triangular matrix. This process is also called LU-decomposition of A. In some example embodiments, Equation (1) is also written as $A = L \times U$.

By way of example, a function f is expressed as $f=(f_1, f_2, \ldots, f_n)$, which $f_i$ ($i=1, 2, \ldots, n$) is only related to matrix off-diagonal elements of the mode of nonnegative function. If for any n order matrix $A=[a_{ij}]$, and $|a_{ii}| > f_i(A)$, $i=1, 2, \ldots n$, then A is non-singular, and function $f=(f_1, f_2, \ldots, f_n)$ is called a G-function.

By way of example, A represents an n order matrix. If a G-function $f=(f_1, f_2, \ldots, f_n)$ makes $|a_{ii}| > f_i(A)$, $i=1, 2, \ldots, n$, then A is called a strictly G-diagonally dominant matrix. A strictly G-diagonally dominant matrix can be decomposed with LU decomposition.

By way of example, if all elements of a matrix are non-negative real numbers, this matrix is called a non-negative matrix. For example, a grey image can be considered as a non-negative matrix. By way of example, when an n order matrix B is not an strictly G-diagonally dominant matrix, let $$A = sI - B, s > 0 \quad (2)$$

where s is the biggest eigenvalue of the matrix B, I is a n×n size matrix and all diagonal values of the matrix I are 1.

By way of example, A is an n order matrix with expression such as Equation (2). $\rho(B)$ is the spectral radius of the matrix B. If $s > \rho(B)$, then matrix A is strictly G-diagonally dominant, and $|A| > 0$.

By way of example, A is an n order matrix with expression such as Equation (2). If matrix A is strictly G-diagonally dominant, then there is a lower triangular matrix L and an upper triangular matrix U making $A=LU$. In this situation, each diagonal element value of the matrix L is 1, and each diagonal element value of the matrix U is positive.

By way of example, for a grey image, a non-negative matrix is obtained and an appropriate s is chosen. As an example, the value s is an embedded key to improve security. For a matrix A that is G-diagonally dominant as Equation (2), the matrix A can be decomposed with LU decomposition.

FIG. 6 shows a graph 600 illustrating LU decomposition of a block in an image in accordance with an example embodiment. As shown in the graph 600, for illustratively purpose only, the block 612 in the image 610 has a corresponding matrix 620 ("block" and "matrix" are sometimes used interchangeably herein). From Equation (2), a matrix $$A = 1.0e+03 \times \begin{bmatrix} 0.8835 & -0.2050 & -0.2000 & -0.1880 & -0.1450 & -0.1020 & -0.0590 & -0.0460 \\ -0.2050 & 0.8865 & -0.1960 & -0.1880 & -0.1340 & -0.0780 & -0.0470 & -0.4730 \\ -0.2030 & -0.2000 & 0.8935 & -0.1860 & -0.1140 & -0.0590 & -0.0440 & -0.0380 \\ -0.2040 & -0.2000 & -0.1940 & 0.9105 & -0.0960 & -0.0510 & -0.0390 & -0.0380 \\ -0.2030 & -0.1980 & -0.1930 & -0.1610 & 1.0125 & -0.0450 & -0.0380 & -0.0350 \\ -0.1990 & -0.1960 & -0.1910 & -0.1350 & -0.0630 & 1.0505 & -0.0330 & -0.0310 \\ -0.1980 & -0.1960 & -0.1810 & -0.1050 & -0.0540 & -0.0350 & 1.0585 & -0.0280 \\ -0.1950 & -0.1940 & -0.1720 & -0.0830 & -0.0450 & -0.0300 & -0.0270 & 1.0585 \end{bmatrix}$$

A is obtained from the matrix 620 as follows, which is strictly G-diagonally dominant. A matrix L and a matrix U are obtained by LU decomposition of A as follows:

$$U = \begin{bmatrix} 883.4876 & -205.0000 & -200.0000 & -188.0000 & -145.0000 & -102.0000 & -59.0000 & -46.0000 \\ 0 & 838.9204 & -242.4070 & -231.6226 & -167.6451 & -101.6676 & -60.6901 & -483.6736 \\ 0 & 0 & 776.1326 & -297.4212 & -196.6965 & -112.3827 & -75.4327 & -191.0350 \\ 0 & 0 & 0 & 679.3630 & -257.8885 & -149.6525 & -100.8055 & -267.9291 \\ 0 & 0 & 0 & 0 & 703.4186 & -229.0336 & -157.3503 & -417.1669 \\ 0 & 0 & 0 & 0 & 0 & 757.3879 & -227.4575 & -611.6788 \\ 0 & 0 & 0 & 0 & 0 & 0 & 782.3879 & -828.7963 \\ 0 & 0 & 0 & 0 & 0 & 0 & 0 & -0.0000 \end{bmatrix}$$

$$L = \begin{bmatrix} 1.0000 & 0 & 0 & 0 & 0 & 0 & 0 & 0 \\ -0.2320 & 1.0000 & 0 & 0 & 0 & 0 & 0 & 0 \\ -0.2298 & -0.2945 & 1.0000 & 0 & 0 & 0 & 0 & 0 \\ -0.2309 & -0.2948 & -0.4015 & 1.0000 & 0 & 0 & 0 & 0 \\ -0.2298 & -0.2922 & -0.3991 & -0.5749 & 1.0000 & 0 & 0 & 0 \\ -0.2252 & -0.2887 & -0.3943 & -0.5321 & -0.5101 & 1.0000 & 0 & 0 \\ -0.2241 & -0.2884 & -0.3810 & -0.4817 & -0.4749 & -0.4104 & 1.0000 & 0 \\ -0.2207 & -0.2852 & -0.3676 & -0.4414 & -0.4420 & -0.3830 & -0.3658 & 1.0000 \end{bmatrix}$$

Figure 7:
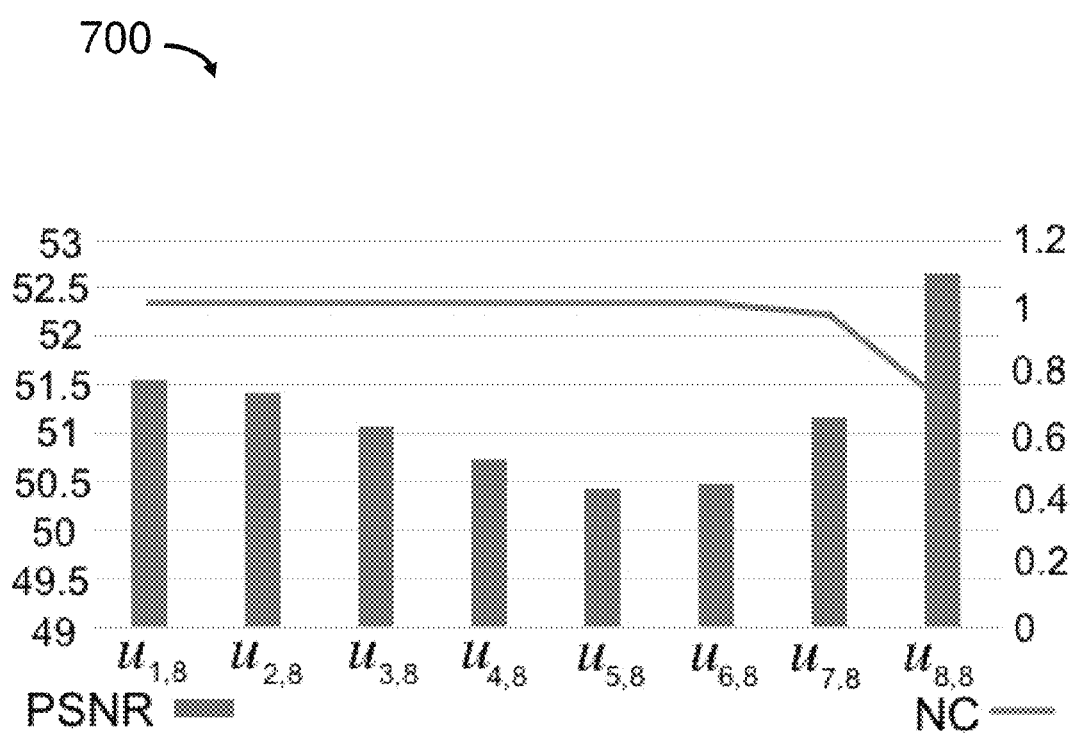
FIG. 7 shows a graph illustrating comparison of watermarking performance for different embedding positions in the last column of a matrix U in accordance with an example embodiment.

FIG. 7 shows a graph 700 illustrating comparison of watermarking performance for different embedding positions in the last column of a matrix U in accordance with an example embodiment.

By way of example, a matrix A is illustrated as a 8×8 matrix as shown in FIG. 6. A LU decomposition of the matrix A is shown in Equation (3) as follows:

$$A = [a_1 \ a_2 \ \ldots \ a_7 \ a_8] = \begin{bmatrix} a_{1,1} & a_{1,2} & a_{1,3} & \ldots & a_{1,7} & a_{1,8} \\ a_{2,1} & a_{2,2} & a_{2,3} & \ldots & a_{2,7} & a_{2,8} \\ a_{3,1} & a_{3,2} & a_{3,3} & \ldots & a_{3,7} & a_{3,8} \\ & & \ldots & & & \\ a_{8,1} & a_{8,2} & a_{8,3} & \ldots & a_{8,7} & a_{8,8} \end{bmatrix} = LU = [l_1 \ l_2 \ l_3 \ \ldots \ l_8][u_1 \ u_2 \ u_3 \ \ldots \ u_8] =$$

$$\begin{bmatrix} l_{1,1} & l_{1,2} & l_{1,3} & \ldots & l_{1,7} & l_{1,8} \\ l_{2,1} & l_{2,2} & l_{2,3} & \ldots & l_{2,7} & l_{2,8} \\ l_{3,1} & l_{3,2} & l_{3,3} & \ldots & l_{3,7} & l_{3,8} \\ & & \ldots & & & \\ l_{8,1} & l_{8,2} & l_{8,3} & \ldots & l_{8,7} & l_{8,8} \end{bmatrix} \begin{bmatrix} u_{1,1} & u_{1,2} & u_{1,3} & \ldots & u_{1,7} & u_{1,8} \\ u_{2,1} & u_{2,2} & u_{2,3} & \ldots & u_{2,7} & u_{2,8} \\ u_{3,1} & u_{3,2} & u_{3,3} & \ldots & u_{3,7} & u_{3,8} \\ & & \ldots & & & \\ u_{8,1} & u_{8,2} & u_{8,3} & \ldots & u_{8,7} & u_{8,8} \end{bmatrix} = \begin{bmatrix} l_{1,1}u_{1,1} & l_{1,1}u_{1,2} + l_{1,2}u_{2,2} & \ldots & l_{1,1}u_{1,8} + l_{1,2}u_{2,8} + \ldots + l_{1,7}u_{7,8} + l_{1,8}u_{8,8} \\ l_{2,1}u_{1,1} & l_{2,1}u_{1,2} + l_{2,2}u_{2,2} & \ldots & l_{2,1}u_{1,8} + l_{2,2}u_{2,8} + \ldots + l_{2,7}u_{7,8} + l_{2,8}u_{8,8} \\ l_{3,1}u_{1,1} & l_{3,1}u_{1,2} + l_{3,2}u_{2,2} & \ldots & l_{3,1}u_{1,8} + l_{3,2}u_{2,8} + \ldots + l_{3,7}u_{7,8} + l_{3,8}u_{8,8} \\ & \ldots & & \\ l_{8,1}u_{1,1} & l_{8,1}u_{1,2} + l_{3,2}u_{2,2} & \ldots & l_{8,1}u_{1,8} + l_{8,2}u_{2,8} + \ldots + l_{8,7}u_{7,8} + l_{8,8}u_{8,8} \end{bmatrix}$$

In an example embodiment, experiments are conducted to test different positions in the matrix U in order to determine which position is best for embedding information. As shown in FIG. 7, peak signal-to-noise ratio (PSNR) (columns) and normalized correlation (NC) (line) are used as indicator to show performance when embedding information into different positions of last column of the matrix U. A larger PSNR and a larger NC indicate better performance. Details regarding PSNR and NC will be discussed later.

As shown in Equation (3), the element $a_{1,1} = l_{1,1} \times u_{1,1}$. A change of the value of $u_{1,1}$ affects $a_{1,1}$ directly. As shown in FIG. 7, $u_{8,8}$ has the highest PSNR value indicating the strongest imperceptiveness, but has smallest NC indicating the weakest robustness. In the example embodiment, $u_{1,8}$ is shown to be the best position to be used to embed information.

Figure 8:
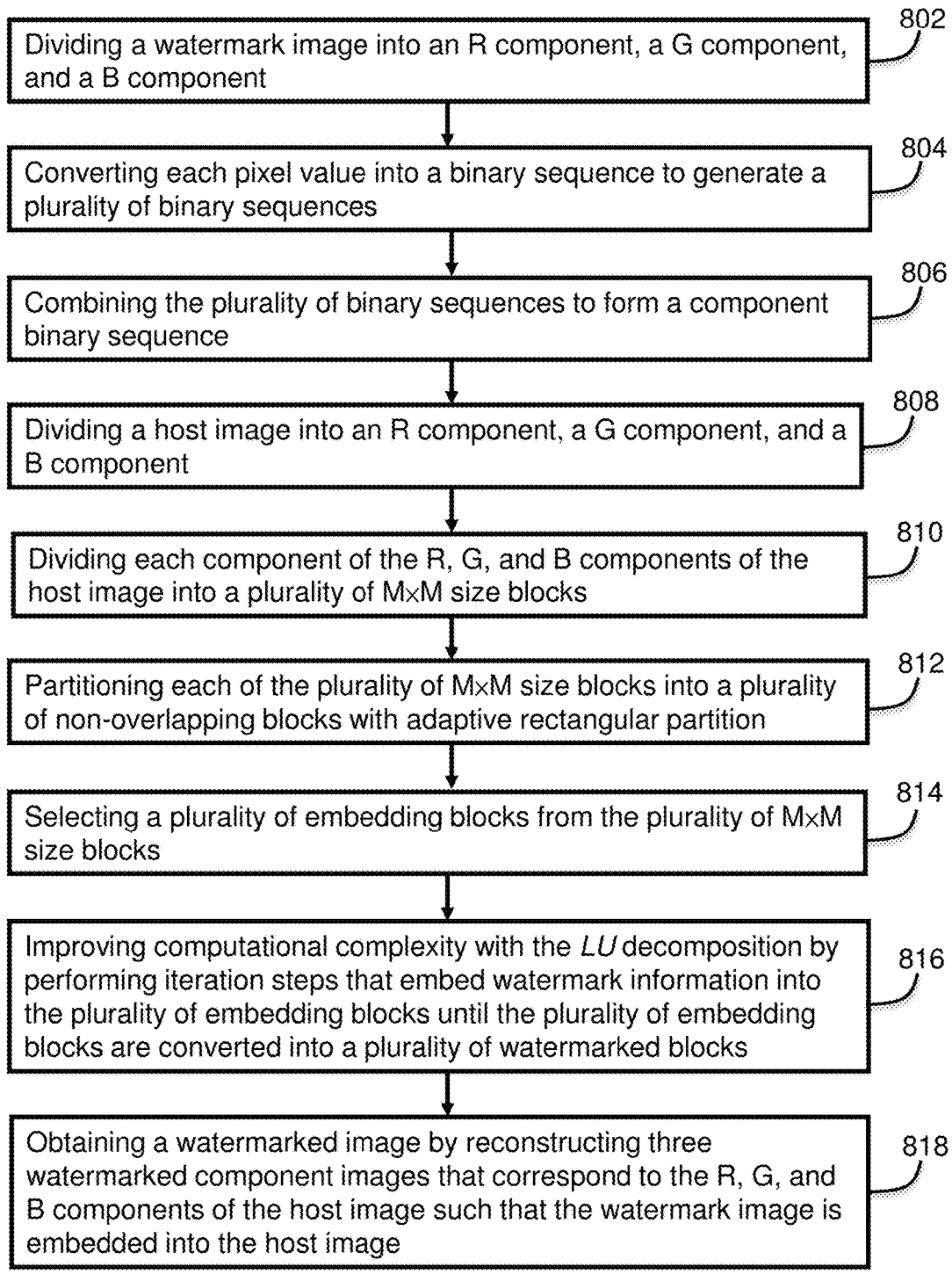
FIG. 8 shows a flow chart illustrating a method to embed a watermark image into a host image in accordance with an example embodiment.

FIG. 8 shows a flow chart illustrating a method to embed a watermark image into a host image in accordance with an example embodiment.

According to block 802, the watermark image is divided into an R component, a G component, and a B component.

For example, the watermark image is a 24-bit color image with size of 32×32. The watermark information of a 24-bit color image is 24 times more than that of a binary image with the same size. The color watermark image is divided or partitioned into three components R, G, B by dimension-reduction treatment.

According to block 804, each pixel value is converted into a binary sequence to generate a plurality of binary sequences.

Each component of the R, G, and B components of the watermark image includes a plurality of pixels and each pixel corresponds to a pixel value. By way of example, for the R component of the watermark image, each pixel value is converted into a binary sequence (such as an 8-bit binary sequence) such that a plurality of binary sequences for the R component are generated or created. Similar process is conducted or done for the G component and the B component. As a result, there are three sets of a plurality of binary sequences that correspond to the R, G, and B components of the watermark image respectively.

In an example embodiment, to improve safety, each component of the R, G, and B of the watermark image is permuted by Arnold transformation with private keys $KA_i$ (i=1,2,3) before converting each pixel value into a binary sequence.

According to block 806, the plurality of binary sequences is combined to form a component binary sequence.

By way of example, for the set of a plurality of binary sequences that corresponds to the R component of the watermark image, the plurality of binary sequences are combined to form a component binary sequence that corresponds to the R component.

Similar process is conducted for the G component and the B component. Thus, three component binary sequences are generated or formed that correspond to the R, G, and B components of the watermark image respectively.

According to block 808, the host image is divided into an R component, a G component, and a B component.

By way of example, the host image is a 24-bit color image with size of 1024×1024. The color host image is divided or partitioned into three components R, G, B by dimension-reduction treatment.

According to block 810, each component of the R, G, and B components of the host image is divided into a plurality of M×M size blocks. M is a whole number greater than zero. In some example embodiments, M=8, which indicates each M×M size block includes 8×8 pixels.

According to block 812, for each component of the R, G, and B components of the host image, each of the plurality of M×M size blocks is partitioned into a plurality of non-overlapping blocks with adaptive rectangular partition.

By way of example, this action can be executed with adaptive partition, or adaptive rectangular adaptive, or adaptive subdivision or non-uniform rectangular partition or non-uniform subdivision treatment with reference to FIG. 2.

By way of example, alternatively and optionally, each component of the R, G, and B components of the host image is divided or partitioned into a plurality of 8×8 size blocks, which indicates each block includes 8×8 pixels. The each 8×8 size block is divided or partitioned into a plurality of non-overlapping blocks with adaptive rectangular partition.

Figure 10:
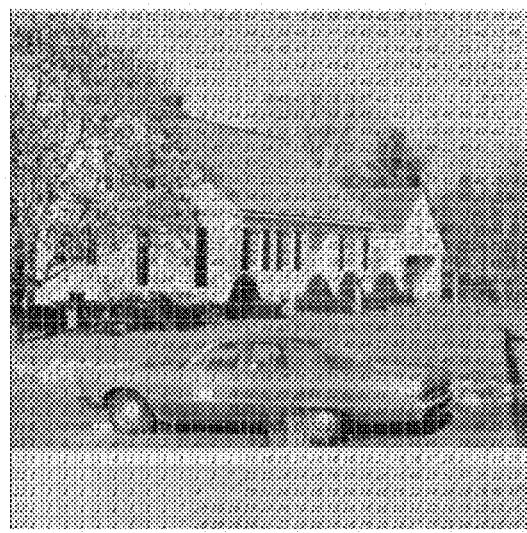
FIG. 10 shows an adaptive rectangular partitioned image in accordance with an example embodiment.

By way of example, data or results such as position information (x,y), width value (w) and height value (h) for sub regions during an adaptive partition process are stored as X, Y, W, H respectively, which are further stored into an array RNO or RNO(r,g,b). By way of example, the number of non-overlapping blocks in each of the plurality of M×M size blocks is stored in an array RNUM or RNUM(r,g,b). For illustrative purpose only, for example, FIG. 10 shows an adaptive rectangular partition image 1000 in accordance with an example embodiment. As shown in the image 1000, each 8×8 size block includes a number that indicates how many partitioned non-overlapping blocks or sub areas in that 8×8 size block.

According to block 814, a plurality of embedding blocks are selected from the plurality of M×M size blocks for each component of the R, G, and B components of the host image.

When a color watermark image is embedded into a host image, all three components (e.g., R, G, and B components) of the host image are selected for embedding watermark information. For each component of the R, G, and B components of the host image, a set of or a plurality of embedding blocks are selected such that watermark information of corresponding component of the watermark image is embedded. For example, a plurality of embedding blocks of the R component of the host image are selected to embed watermark information of the R component of the watermark image.

In an example embodiment, for each component of the R, G, and B components of the host image, a random non-collision sequence is generated that indicates an order of embedding blocks that watermark information is embedded.

By way of example, optionally, to resist Geometric attacks, a size of (length×M) random non-collision sequence R (R list) is generated or created to indicate an order for the embedding blocks, wherein the length is equal to the total length of the three component binary sequences as stated with reference to block 806. In some example embodiments, M=8.

According to block 816, computational complexity is improved with the LU decomposition by performing iteration steps that embed watermark information into the plurality of embedding blocks until the plurality of embedding blocks are converted into a plurality of watermarked blocks.

By way of example, an R component of the host image includes a plurality of embedding blocks that are selected with reference to block 814. Iteration steps are performed such that each of the plurality of embedding blocks is converted into a watermarked block. As a result, a watermarked component image for the R component of the host image is formed that includes all watermarked blocks for the R component of the host image. Iteration steps are similarly conducted or performed for the G component and the B component of the host image to generate another two watermarked component images that correspond to the G component and the B component respectively.

Take the R component of the host image as an example for illustrative purpose only. Example iteration steps include: (1) transforming an original block matrix of an embedding block into a strictly G-diagonally dominant matrix; (2) decomposing the strictly G-diagonally dominant matrix of the embedding block with the LU decomposition to obtain a matrix L and a matrix U, wherein the matrix L is a lower triangular matrix and the matrix U is an upper triangular matrix; (3) embedding, for the embedding block, watermark information or data into the matrix U; (4) conducting an inverse LU operation for the embedding block to obtain a watermarked block; and (5) moving to next embedding block and performing steps (1-5) iteratively until all the embedding blocks for the R component are converted or transformed into watermarked blocks such that a watermarked component image for the R component is generated. Iteration steps are also performed for the G and B component of the host image.

As an example, the watermark information or data is a watermark bit that can be 0 or 1. By way of example, iteration steps embed watermark information or data into the element of first row and last column of the matrix U for each embedding block.

For illustrative purpose only, in an example embodiment, taking an R component of a host image as an example, the iteration steps includes:

(a) transforming an original block matrix of an embedding block into a strictly G-diagonally dominant matrix A, wherein the strictly G-diagonally dominant matrix A is a M×M matrix (such as a 8×8 matrix). For example, the original block matrix can be transformed into the strictly G-diagonally dominant matrix following Equation (2). An example original block matrix 620 of a block and an example strictly G-diagonally dominant matrix A are stated above with reference to FIG. 6.

(b) decomposing the strictly G-diagonally dominant matrix A of the embedding block with the LU decomposition to obtain a matrix L and a matrix U such that A=L×U, wherein the matrix L is a lower triangular matrix and the matrix U is an upper triangular matrix. For example, A, L and U are all M×M matrices.

(c) calculating, for the embedding block, a step intensity or quantization step Δ with Equation (4):

$$\Delta = 0.01 + RNUM \times \alpha / 16 \qquad (4),$$

Wherein RNUM represents a number of the plurality of non-overlapping blocks or sub areas in the embedding block, α is a coefficient in a range between 0.01 and 0.05;

(d) determining, for the embedding block and based on watermark information w, modifying values $T_1$ and $T_2$ with Equations (5) and (6):

$$\text{if } w = 1, \quad \begin{cases} T_1 = 0.5\Delta \\ T_2 = -1.5\Delta \end{cases} \qquad (5)$$

$$\text{if } w = 0, \quad \begin{cases} T_1 = -0.5\Delta \\ T_2 = 1.5\Delta \end{cases} \qquad (6)$$

(e) determining, for the embedding block, quantization results $C_1$ and $C_2$ with Equations (7) and (8):

$$C_1 = 2k\Delta + T_1 \qquad (7)$$

$$C_2 = 2k\Delta + T_2 \qquad (8),$$

where k=floor(ceil($U_{1,M}/\Delta$)/2), and $U_{1,M}$ is an matrix element in the first row and the M-th column of the matrix U, floor( ) gets the least nearest integer, and ceil( ) gets the largest nearest integer. For example, floor(x) gets largest integer less than or equal to x, and ceil (x) gets smallest integer greater than or equal to x. In this example embodiment, the first row and the M-th column of the matrix U is used to embed watermark information, which is for illustrative purpose only. A person of ordinary skill in the art would appreciate other positions in the matrix U can also be used to embed watermark information.

(f) calculating, for the embedding block, an element $U_{1,M}'$ with Equation (9):

$$U_{1,M}' = \begin{cases} C_2, & \text{if abs}(U_{1,M} - C_2) < \text{abs}(U_{1,M} - C_1) \\ C_1, & \text{else} \end{cases} \qquad (9)$$

wherein abs( ) gets an absolute value. For example, abs(−1)=1.

(g) replacing, for the embedding block, $U_{1,M}$ with $U_{1,M}'$ in the matrix U to obtain a matrix U';

(h) conducting, for the embedding block, an inverse LU operation to obtain a watermarked block A' with Equation (10)

$$A' = L \times U' \qquad (10); \text{ and}$$

(i) moving to next embedding block.

(a-i) are performed iteratively until all the embedding blocks for the R component are converted into watermarked blocks such that a watermarked component image for the R component is generated. Iteration steps are also performed for the G and B component of the host image to obtain another two watermarked component images that correspond to the G component and the B component respectively.

According to block 818, a watermarked image is obtained by reconstructing three watermarked component images that correspond to the R, G, and B components of the host image such that the watermark image is embedded into the host image.

Example methods with reference to blocks 802-818 are for illustrative purpose. A skilled person in the art would conceive of various variations and modifications that fall within scope of the illustrative examples.

Figure 9:
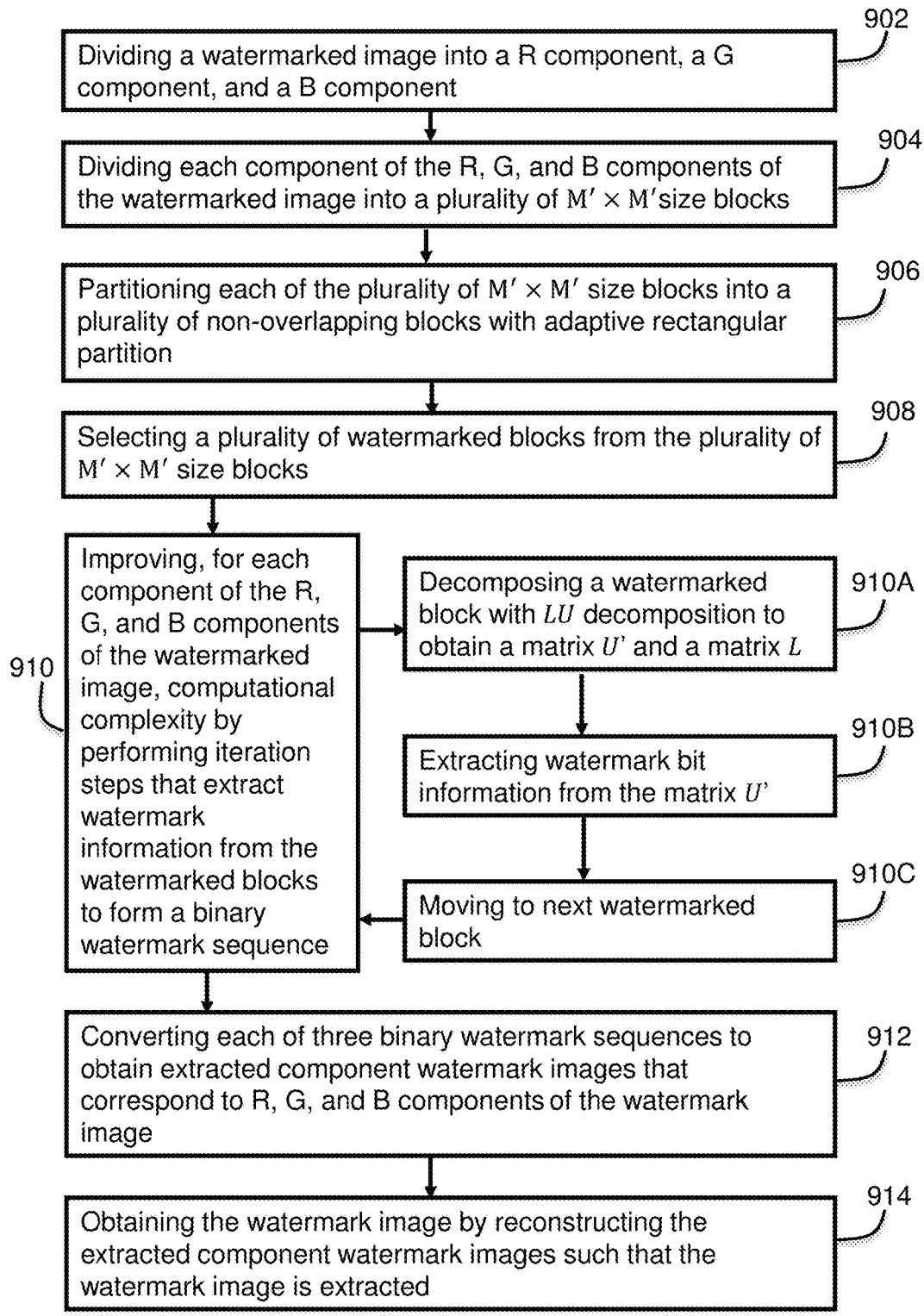
FIG. 9 shows a method to extract a watermark image from a watermarked image in accordance with an example embodiment.

FIG. 9 shows a method to extract a watermark image from a watermarked image in accordance with an example embodiment.

According to block 902, a watermarked image is divided into an R component, a G component, and a B component.

For example, the watermarked image is a 24-bit color image with size of 1024×1024. The color watermarked image is divided or partitioned into three components R, G, B by dimension-reduction treatment.

According to block 904, each component of the R, G, and B components of the watermarked image is divided into a plurality of M'×M' size blocks. M' is a whole number greater than zero. For example, M'=8, which indicates each M'×M' size block includes 8×8 pixels.

According to block 906, each of the plurality of M'×M' size blocks is partitioned into a plurality of non-overlapping blocks with adaptive rectangular partition.

By way of example, this action can be executed with adaptive partition, or adaptive rectangular adaptive, or adaptive subdivision or non-uniform rectangular partition or non-uniform subdivision treatment with reference to FIG. 2.

By way of example, alternatively and optionally, each component of the R, G, and B components of the watermarked image is divided or partitioned into a plurality of 8×8 size blocks, which indicates each block includes 8×8 pixels. The each 8×8 size block is divided or partitioned into a plurality non-overlapping blocks with adaptive rectangular partition.

By way of example, data or results such as position information (x', y'), width value (w') and height value (h') for sub regions during an adaptive partition process are stored as X', Y', W', H' respectively, which are further stored into an array RNO' or RNO'(r,g,b). By way of example, the number of non-overlapping blocks in each of the plurality of M'×M' size blocks is stored in an array RNUM'(r,g,b).

According to block 908, for each component of the R, G, and B components of the watermarked image, a plurality of watermarked blocks are selected from the plurality of M'×M' size blocks.

When extracting a watermark image from a watermarked image, all three components of the watermarked image (e.g. R, G, and B components) are selected for extracting watermark information or data. For each component of the R, G, and B components of the watermarked image, a set of or a plurality of watermarked blocks are selected such that watermark information of corresponding component of the watermark image is extracted. For example, a plurality of watermarked blocks of the R component of the watermarked image are selected to extract watermark information of the R component of the watermark image.

In an example embodiment, for each component of the R, G, and B components of a watermarked image, a random non-collision sequence is used to indicate order of watermarked blocks that watermark information is extracted. For example, the random non-collision sequence can be a sequence R (R list) as stated with reference to FIG. 8.

According to block 910, for each component of the R, G, and B components of the watermarked image, computational complexity is improved by performing iteration steps that extract watermark information from the plurality of watermarked blocks to form a binary watermark sequence.

By way of example, the R component of the watermarked image includes a plurality of watermarked blocks that are selected with reference to block 908. Iteration steps are performed such that watermark information is extracted from each of the plurality of watermarked blocks. As a result, a binary watermark sequence for the R component of the watermarked image is formed or created. Iteration steps are similarly conducted for the G component and the B component of the watermarked image to generate another two binary watermark sequences.

The iteration steps with reference to block 910 include three sub-steps as shown in blocks 910A-910C.

According to block 910A, a watermarked block or block matrix is decomposed with LU decomposition to obtain a matrix U' and a matrix L', wherein the matrix U' is an upper triangular matrix and the matrix L' is a lower triangular matrix. According to block 910B, watermark information or data is extracted from the matrix U' for the watermarked block. According to block 910C, steps move to next watermarked block. Blocks 910A-910C are iteratively performed until all watermark information is extracted from each component of the R, G, and B components of the watermarked image to form a binary watermark sequence such that three binary watermark sequences are generated as a result.

In some example embodiments, a watermarked block or block matrix is not a strictly G-diagonally dominant matrix. The watermarked block is transformed into a strictly G-diagonally dominant matrix before being decomposed with LU decomposition to obtain a matrix U' and a matrix L'.

In some example embodiments, taking the R component of the watermarked image as an example for illustrative purpose only, the iteration steps includes:

(a) calculating a step intensity or quantization step Δ' for the watermarked block with Equation (11):

$$\Delta'=0.01+RNUM'\times a'/16 \quad (11);$$

where RNUM' represents a number of the plurality of non-overlapping blocks in the watermarked block, a' is coefficient in a range between 0.01 and 0.05.

(b) determining watermark information w' for the watermarked block with Equation (12):

$$w'=\mathrm{mod}(\mathrm{ceil}(U_{1,M'}'/\Delta,2) \quad (12)$$

where mod( ) is the modulo operation, and cell( ) gets the largest nearest integer, and $U_{1,M'}'$ is an element in the first row and the M'-th column of the matrix U' with column number of M'.

(c) moving to next watermarked block.

Steps (a-c) are performed iteratively until watermark information is extracted from all the watermarked blocks for the R component such that a binary watermark sequence for the R component is generated. These iteration steps are also performed for the G and B component of the watermarked image. As a results, three binary watermark sequences are obtained. As an example, the watermark information or data is a watermark bit that can be 0 or 1.

According to block 912, each of three binary watermark sequences is converted or transformed to obtain extracted component watermark images that correspond to R, G, and B components of the watermark image.

For example, a binary watermark sequence that is generated from processing the R component of the watermarked image is converted such that an extracted component watermark image that correspond to the R component of the watermark image is obtained or generated.

In some example embodiments, the binary watermark sequence for the R component of the watermark image is divided into a plurality of groups such as 8-bit groups, and each group is converted into a decimal pixel value. This process is also performed for the binary watermark sequences for the G and B components of the watermark image respectively.

According to block 914, a watermark image is obtained by reconstructing the three extracted component watermark images such that the watermark image is extracted.

In an example embodiment, an inverse Arnold transformation is conducted with private keys for each of the extracted component watermark images before being reconstructed to obtain the watermark image.

Example methods with reference to blocks 902-914 are for illustrative purpose. A skilled person in the art would conceive of various variations and modifications that fall within scope of the illustrative examples.

Figure 11:
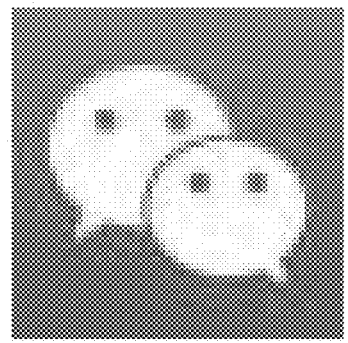
FIG. 11 shows a color watermark image in accordance with an example embodiment.
Figure 12A:
FIG. 12A shows a test images in accordance with an example embodiment.
Figure 12B:
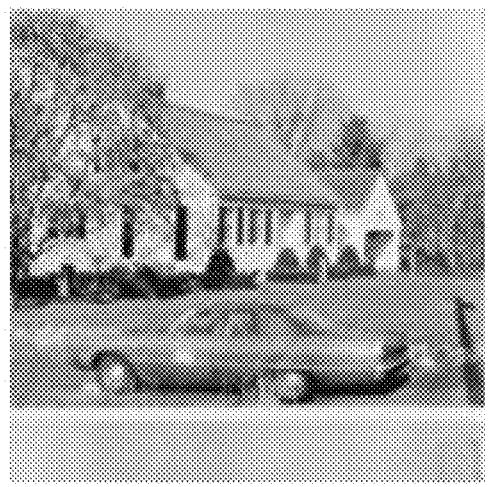
FIG. 12B shows a test images in accordance with an example embodiment.
Figure 12C:
FIG. 12C shows a test images in accordance with an example embodiment.
Figure 12D:
FIG. 12D shows a test images in accordance with an example embodiment.

FIG. 11 shows a color watermark image 1100 in accordance with an example embodiment. The example color watermark image 1100 can be used to illustrate example methods as stated above. For example, the example color watermark image 1100 is a 24-bit color image with size of 32×32. The color watermark image 1100 can be embedded into a 24-bit host image with size of 1024×1024 from a large-scale image database CVG-UGR.

FIGS. 12A-12D show four test images 1210-1240 in accordance with an example embodiment. As an example, the four test images 1210-1240 are called Lena, House, Hsewoods, and London respectively. By way of example, each of the four test images 1210-1240 are 24-bit color image with a size of 1024×1024.

There are a number of indicators to evaluate the performance of watermarking. By way of example, for quantitative evaluation of robustness, two similarity measurements, peak signal-to-noise ratio (PSNR) and normalized correlation (NC) are adopted to evaluate performance of methods in accordance with one or more example embodiments (hereinafter called "Proposed"). By way of example, PSNR is used to evaluate quality difference between an original host image and a watermarked image that is derived or obtained from the host image with a watermark image embedded. For example, a larger PSNR indicates the watermarked image resembles the original host image more closely, which indicates the watermarking method makes the watermark image more imperceptible. By way of example, PSNR is defined by following formula:

$$PSNR = \frac{\sum_{t=1}^{3} PSNR(t)}{3} \quad (13)$$

$$PSNR(t) = 10\log_{10} \frac{M \times N \times 255^2}{\sum_{i=1}^{M} \sum_{j=1}^{N} (H_{i,j}(t) - H_{i,j}^A(t))^2} \quad (14)$$

where $H_{i,j}$ represents an original color host image, and $H_{i,j}^A$ represents a watermarked color image. PSNR(t), t=1, 2, 3 represents the PSNR of the R component, G component and B component. The size of the images is M×N.

For example, lower PSNR value indicates more severe damage that is caused by one or more attacks (such as JPEG compression, Gaussian noise, salt and pepper noise, scaling and cropping attacks), and high PSNR value suggests or indicates stronger imperceptible capability.

In some example embodiments, the NC defined in equation (15) is adopted to evaluate the similarity between an original secret image or watermark image and a retrieved secret image or extracted watermark image. Higher NC value indicates better robustness and better copyright protection scheme.

$$NC = \frac{\sum_{t}^{3} \sum_{i=1}^{m} \sum_{j=1}^{n} S_{i,j}(t) S_{i,j}^R(t)}{\sqrt{\sum_{t}^{3} \sum_{i=1}^{m} \sum_{j=1}^{n} S_{i,j}(t) S_{i,j}(t)} \sqrt{\sum_{t}^{3} \sum_{i=1}^{m} \sum_{j=1}^{n} S_{i,j}^R(t) S_{i,j}^R(t)}} \quad (15)$$

where $S_{i,j}$ represents the value of each pixel in component t, t=1, 2, 3 of an original watermark image, $S_{i,j}^R$ represents the value of each pixel in component t, t=1,2,3 of the retrieved or extracted watermark image, and the size of the images is m×n.

FIG. 13 shows a table 1300 illustrating performance comparison between an example method in accordance with an example embodiment and three existing methods.

As shown in the table 1300, watermarked images are Lena, House, Hsewoods, and London respectively as stated with reference to FIGS. 12A-12D with a watermark image (herein using the watermark image 1100 as stated with reference to FIG. 11 as an example) embedded.

"Extracted watermark" as shown in the table 1300 in FIG. 13 indicates an extracted watermark image that is obtained from a watermarked image. The values in the row of "Watermarked image (PSNR(db))", such as 66.0058, 39.9191, 50.0839, 92.0586, etc. are PSNR values in dB unit. The values in the row of "Extracted watermark (NC)", such as 1.000, 0.9863, etc. are NC values. Larger PSNR and larger NC suggests better performance.

By way of example, FIG. 13 illustrates comparison between an example method (such as an example method as stated with reference to FIG. 9) and three existing or prior art methods, where:

"Proposed Algorithm": also called an example method, referring to one or more methods in accordance with one or more example embodiments herein (such as an example method as stated with reference to FIG. 9); and The three existing or prior art methods are as follows:
(1) "Yashar": methods used in "Y. Naderahmadian and S. Hosseini-Khayat, "Fast watermarking based on QR decomposition in wavelet domain." Intelligent Information Hiding and Multimedia Signal Processing (IIH-MSP), 2010 Sixth International, pp. 127-130, 2010.";
(2) "Su Schur": methods used in "Q. Su, Y. Niu, X. Liu, and Y. Zhu, "Embedding color watermarks in color images based on Schur decomposition," Optics Communications, vol. 285, no. 7, pp. 1792-1802, 2012."
(3) "Su QR"": methods used in "Q. Su, Y. Niu, G. Wang, S. Jia, and J. Yue, "Color image blind watermarking scheme based on QR decomposition," Signal Processing, vol. 94, no. 1, pp. 219-235, 2014."

As shown, the performance of "Proposed Algorithm" has higher PSNR and larger NC compared with the three existing methods, which indicates that example methods as described herein have better performance such as stronger imperceptible capability and high similarity between an extracted watermark image and an original watermark image.

Figures 14, 15:
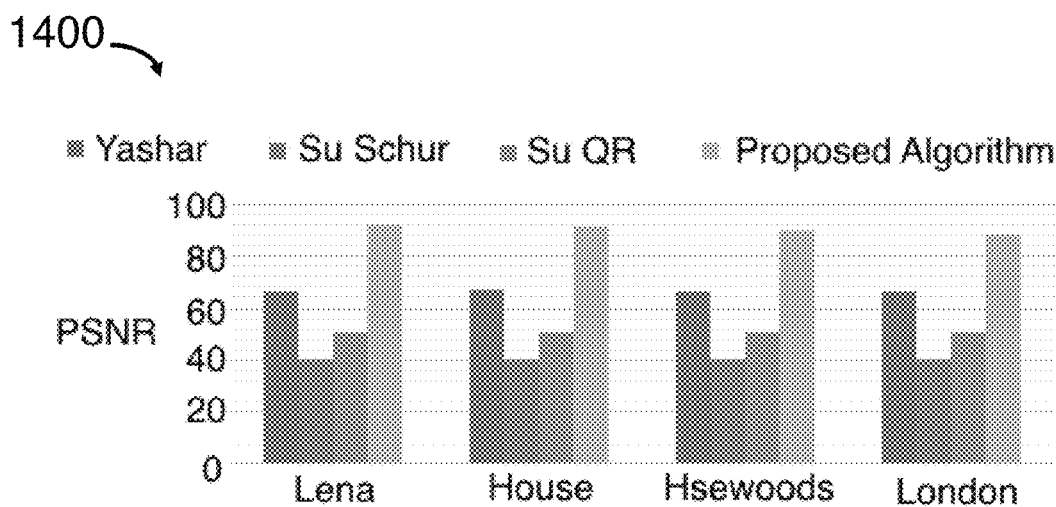
FIG. 14 shows a graph illustrating performance comparison between an example method in accordance with an example embodiment and three existing methods.
FIG. 15 shows eleven attacks in accordance with an example embodiment.
Figure 16A:
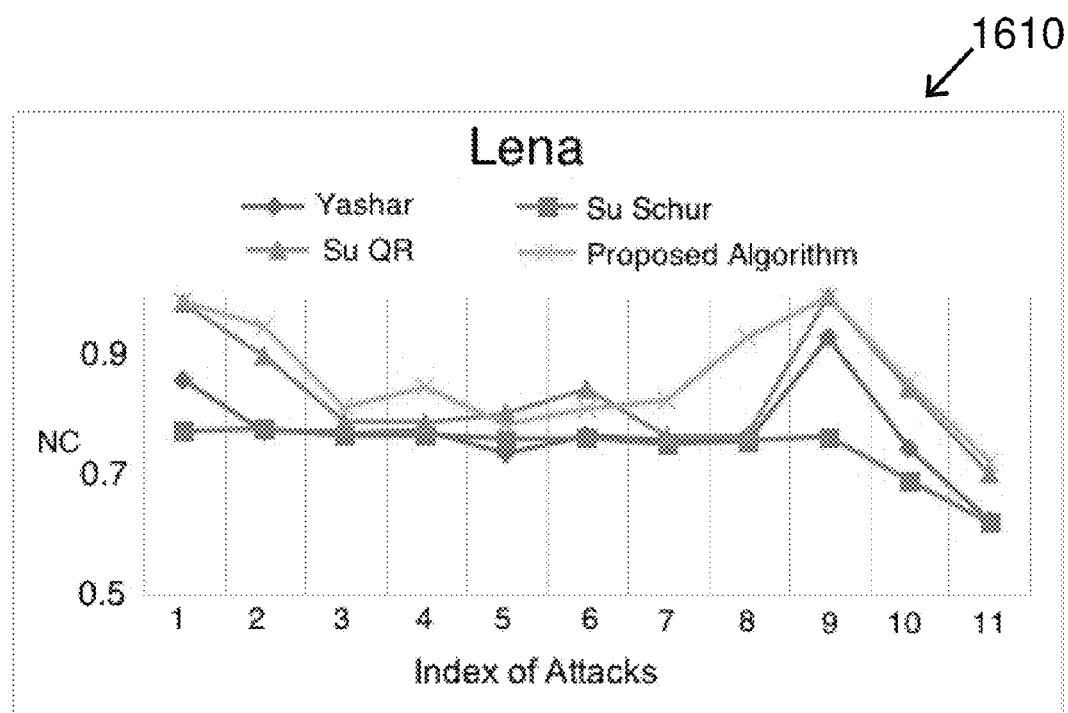
FIG. 16A shows a graph illustrating performance comparison between an example method in accordance with an example embodiment and three existing methods.
Figure 16B:
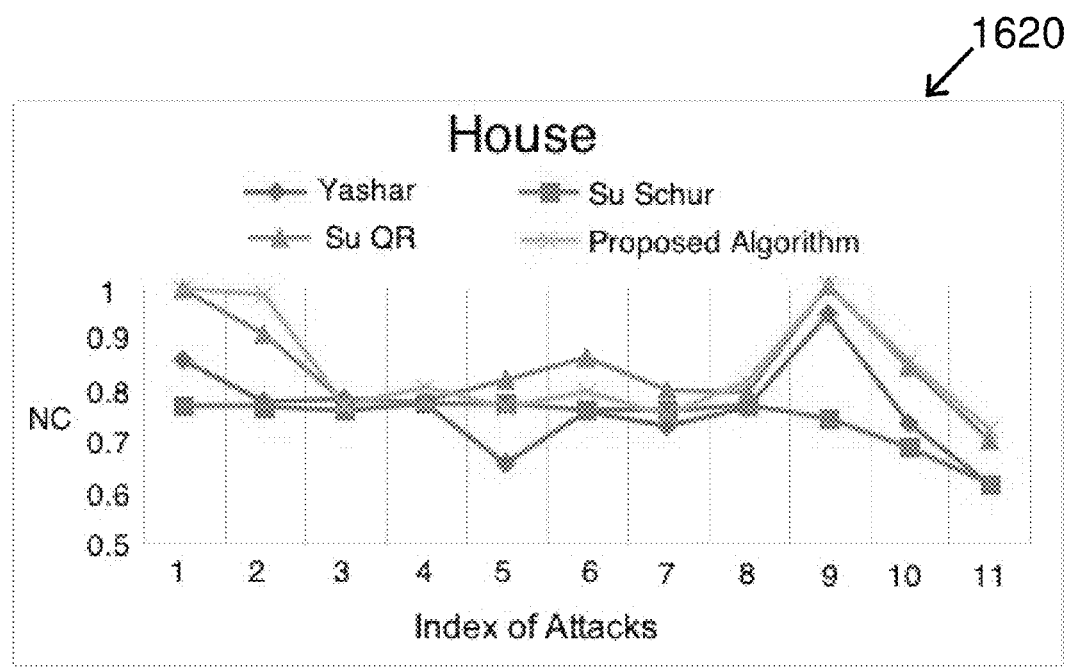
FIG. 16B shows a graph illustrating performance comparison between an example method in accordance with an example embodiment and three existing methods.
Figure 16C:
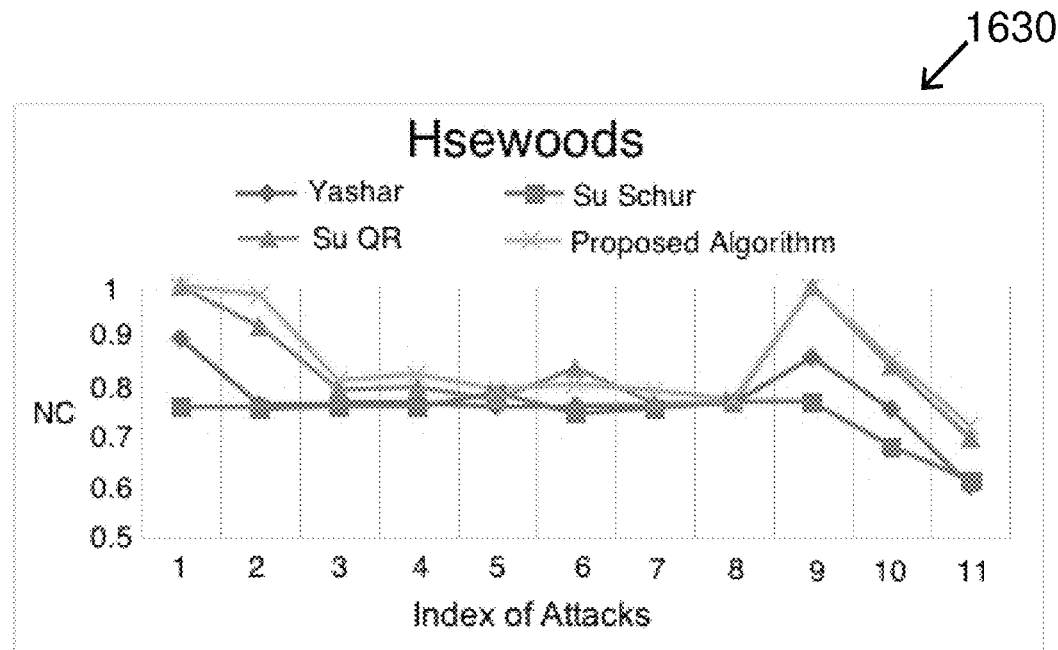
FIG. 16C shows a graph illustrating performance comparison between an example method in accordance with an example embodiment and three existing methods.
Figure 16D:
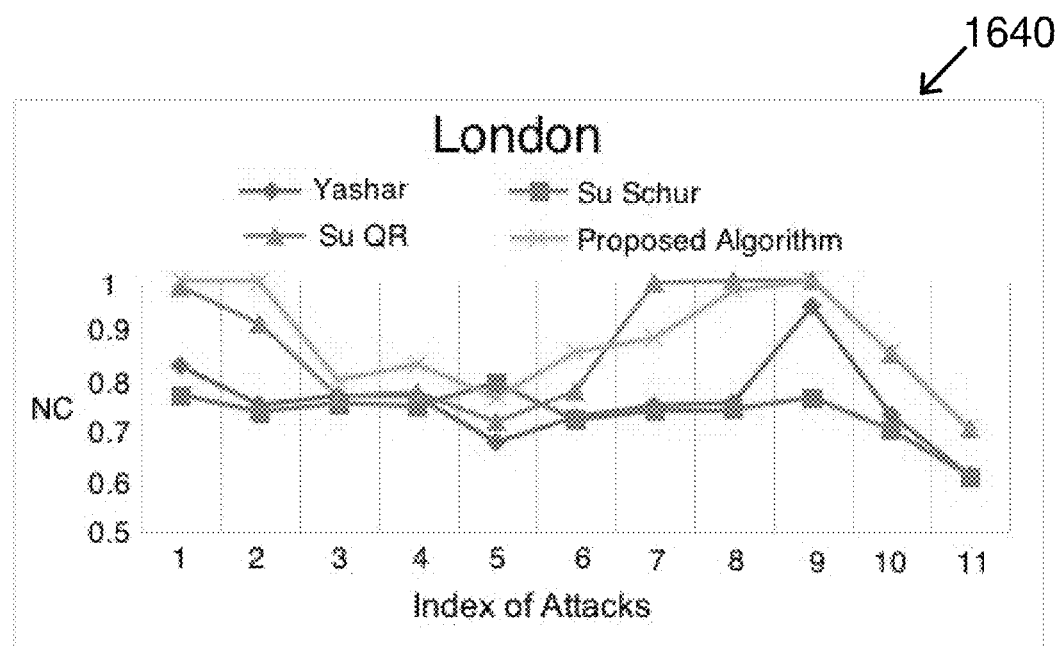
FIG. 16D shows a graph illustrating performance comparison between an example method in accordance with an example embodiment and three existing methods.

The PSNR values for each watermarked image obtained by using the four methods respectively are also illustratively shown a graph 1400 in FIG. 14. In FIG. 14, the horizontal axis shows the four watermarked images (Lena, House, Hsewoods, and London). The vertical axis shows PSNR values. As shown, the example method has PSNR value nearly two times higher than those obtained by using the three existing methods, which indicates the example method shows stronger imperceptibility.

FIG. 15 is a table 1500 showing eleven attacks in accordance with an example embodiment. These attacks are used in one or more example tests in accordance with one or more example embodiments. The one or more example tests test performance of one or more example methods as stated herein.

By way of example, the Attacks in the table 1500 are explained as follows:
"Salt and pepper noise addition (0.02)" indicates the noising addition scheme generates 0.02 noise;
"Salt and pepper noise addition (0.1)" indicates the noising addition scheme generates 0.1 noise";
"Gaussian noise addition (5%)" indicates the mean of the Gaussian parameter is set to be 0.05;
"Gaussian noise addition (8%)" indicates the mean of the Gaussian parameter is set to be 0.08;
"JPEG compression (30)" indicates watermarked images are compressed with a compression factor of 30;
"JPEG compression (90)" indicates watermarked images are compressed with a compression factor of 90;
"JPEG 2000 compression (20)" indicates watermarked images are compressed with a compression factor of 20;
"JPEG 2000 compression (50)" indicates watermarked images are compressed with a compression factor of 50;
"Scaling (4)" indicates a scaling operation of 400% is utilized to deteriorate watermarked images;
"Cropping (25%)" indicates watermarked images are cropped by 25%; and
"Cropping (50%)" indicates watermarked images are cropped by 50%".

FIGS. 16A-16D show graphs 1610-1640 illustrating performance comparison between an example method in accordance with an example embodiment and three existing methods. In each of the graphs 1610-1640, the horizontal axis indicates eleven attacks as shown in FIG. 15. The vertical axis indicates NC values.

The host images used are those with reference to FIGS. 12A-12D (i.e. Lena, House, Hsewoods, and London, respectively). The three existing methods are stated with reference to FIG. 13 ("Yashar": line with diamond; "Su schur": line with square; "Su QR": line with triangle; "Proposed Algorithm": line only).

Take noise attacks as an example. Salt and pepper noise can be roughly thought as a signal with plenty of high frequencies. FIGS. 16A-16D shows proposed watermarking scheme ("Proposed Algorithm") has higher NC under sale peppers noise and Gaussian noise attack, which indicates that the example method have better performance against noise attacks and are robust against salt and pepper noise.

For compression attacks, JPEG (Joint Photographic Experts Group) compression is one of the most popular image compression algorithms. A watermarking scheme is expected to be robust against JPEG compression. As shown in FIGS. 16A-16D, compared with the three existing methods, the example method ("Proposed Algorithm") has similar performance for JPEG (30) attack and JPEG (90) attack, and have better performance for JPEG 2000(20) attack.

Figure 17:
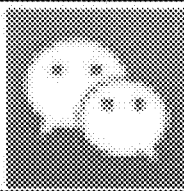
FIG. 17 shows a table illustrating experimental results of replacement key and selection sequence in accordance with an example embodiment.
Figure 17:
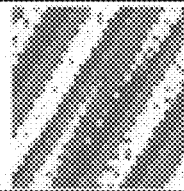
Figure 17:
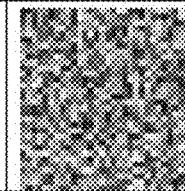
Figure 17:
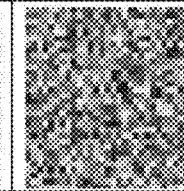

FIG. 17 shows a table 1700 illustrating experimental results of replacement key and selection sequence in accordance with an example embodiment.

A replacement key or secret key (such as Arnold key KA) facilitates confidentiality of an algorithm or method, and a selection sequence can enhance the security of watermarking including watermark embedding and extracting. Only replacing the key and choosing the right time, the watermarking of target in the same time-series can be obtained. Otherwise, it is unable to get or determine whether there is a watermarking or not. This would greatly improve the security of the watermarking process. At same time, the selected block sequence is kept as a digital signature, which increases watermarking safety.

Figure 18:
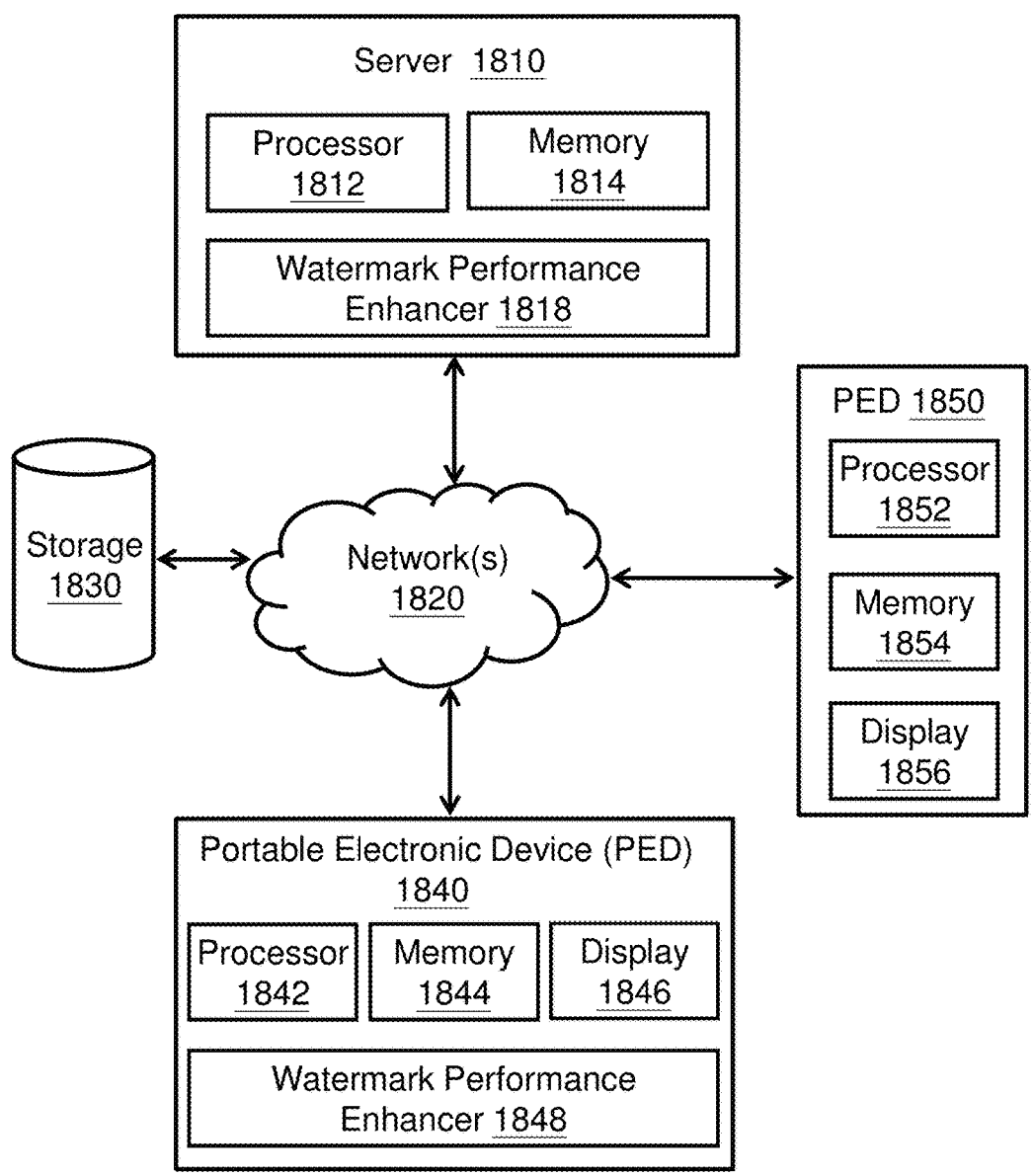
FIG. 18 shows a computer system in accordance with an example embodiment.

FIG. 18 shows a computer system or electronic system 1800 in accordance with an example embodiment. The computer system 1800 includes one or more computers or electronic devices (such as one or more servers) 1810 that includes a processor or processing unit 1812 (such as one or more processors, microprocessors, and/or microcontrollers), one or more components of computer readable medium (CRM) or memory 1814, and a watermark performance enhancer 1818.

The memory 1814 stores instructions that when executed cause the processor 1812 to execute a method discussed herein and/or one or more blocks discussed herein. The watermark performance enhancer 1818 is example of specialized hardware and/or software that assist in improving performance of a computer and/or execution of a method discussed herein and/or one or more blocks discussed herein. Example functions of a watermark performance enhancer are discussed in connection with FIGS. 2, 8 and 9.

In an example embodiment, the computer system 1800 includes a storage or memory 1830, a portable electronic device or PED 1840 in communication over one or more networks 1820.

The storage 1830 can include one or more of memory or databases that store one or more of image files, audio files, video files, software applications, and other information discussed herein. By way of example, the storage 1830 store image, instructions or software application that are retrieved by the server 1810 over the network 1820 such that a method discussed herein and/or one or more blocks discussed herein are executed.

The PED 1840 includes a processor or processing unit 1842 (such as one or more processors, microprocessors, and/or microcontrollers), one or more components of computer readable medium (CRM) or memory 1844, one or more displays 1846, and a watermark performance enhancer 1848.

The PED 1840 can execute a method discussed herein and/or one or more blocks discussed herein and display an image (such as a watermark image, a host image, and a watermarked image) for review. Alternatively or additionally, the PED 1840 can retrieve files such as images and software instructions from the storage 1830 over the network 1820 and execute a method discussed herein and/or one or more blocks discussed herein.

In an example embodiment, the computer system 1800 includes a PED 1850 that includes a processor or processing unit 1852 (such as one or more processors, microprocessors, and/or microcontrollers), one or more components of computer readable medium (CRM) or memory 1854, and one or more displays 1856.

By way of example, the PED 1850 communicates with the server 1810 and/or the storage 1830 over the network 1820 such that a method discussed herein and/or one or more blocks discussed herein is executed by the server 1810 and results are sent back to the PED 1850 for output, storage and review.

The network 1820 can include one or more of a cellular network, a public switch telephone network, the Internet, a local area network (LAN), a wide area network (WAN), a metropolitan area network (MAN), a personal area network (PAN), home area network (HAM), and other public and/or private networks. Additionally, the electronic devices need not communicate with each other through a network. As one example, electronic devices can couple together via one or more wires, such as a direct wired-connection. As another example, electronic devices can communicate directly through a wireless protocol, such as Bluetooth, near field communication (NFC), or other wireless communication protocol.

In some example embodiments, the methods illustrated herein and data and instructions associated therewith, are stored in respective storage devices that are implemented as non-transitory computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Blocks and/or methods discussed herein can be executed a processor, controller, and other hardware discussed herein. Furthermore, blocks and/or methods discussed herein can be executed automatically with or without instruction from a user.

The methods in accordance with example embodiments are provided as examples, and examples from one method should not be construed to limit examples from another method. Figures and other information show example data and example structures; other data and other database structures can be implemented with example embodiments. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

As used herein, the term "watermarking" refers to a process of hiding information in a carrier signal or image as well as a process of extracting information from a carrier signal or image with hidden information. The hidden information may, but does not need to, include a relation to the carrier signal or image.

As used herein, the term "watermark image" refer to an image that is to be embedded into a host image or carrier image. A watermark image, when embedded into a host image, for example, may be used to verify the authenticity or integrity of the host image or to show the identity of its owner(s).

As used herein, the term "host image" refer to an image into which a watermark image is to be embedded.

As used herein, the term "watermarked image" refer to a host image that has a watermark image embedded.

What is claimed is:

1. A method that is executed by a computer system to improve computational complexity with LU decomposition when embedding a watermark image into a host image to generate a watermarked image, wherein both the host image and the watermark image are color images, and the method comprising:
dividing, by the computer system, the watermark image into a Red (R) component, a Green (G) component, and a Blue (B) component;
converting, by the computer system and for each component of the R, G, and B components of the watermark image, each pixel value into a binary sequence to generate a plurality of binary sequences;
combining, by the computer system and for each component of the R, G, and B components of the watermark image, the plurality of binary sequences to form a component binary sequence such that three component binary sequences are formed that correspond to the R, G, and B components of the watermark image;
dividing, by the computer system, the host image into an R component, a G component, and a B component;
dividing, by the computer system, each component of the R, G, and B components of the host image into a plurality of M×M size blocks, wherein M is a whole number greater than zero;
partitioning, by the computer system and for each component of the R, G, and B components of the host image, each of the plurality of M×M size blocks into a plurality of non-overlapping blocks with adaptive rectangular partition;
selecting, by the computer system and for each component of the R, G, and B components of the host image, a plurality of embedding blocks from the plurality of M×M size blocks;
improving, by the computer and for each component of the R, G, and B components of the host image, the computational complexity with the LU decomposition by performing iteration steps that embed watermark information into the plurality of embedding blocks until the plurality of embedding blocks are converted into a plurality of watermarked blocks such that a watermarked component image is formed that includes the plurality of watermarked blocks; and
obtaining, by the computer system, the watermarked image by reconstructing three watermarked component images that correspond to the R, G, and B components of the host image such that the watermark image is embedded into the host image.

2. The method of claim 1, wherein the iteration steps comprising:
transforming, by the computer system, an original block matrix of an embedding block into a strictly G-diagonally dominant matrix;
decomposing, by the computer system, the strictly G-diagonally dominant matrix of the embedding block with the LU decomposition to obtain a matrix L and a matrix U, wherein the matrix L is a lower triangular matrix and the matrix U is an upper triangular matrix;
embedding, by the computer system and for the embedding block, watermark information into the matrix U;
conducting, by the computer system and for the embedding block, an inverse LU operation to obtain a watermarked block; and
moving, by the computer system, to next embedding block.

3. The method of claim 1, wherein the iteration steps further comprising:
transforming, by the computer system, an original block matrix of an embedding block into a strictly G-diagonally dominant matrix A, wherein the strictly G-diagonally dominant matrix A is a M×M matrix;
decomposing, by the computer system, the strictly G-diagonally dominant matrix A of the embedding block with the LU decomposition to obtain a matrix L and a matrix U such that A=L×U, wherein the matrix L is a lower triangular matrix and the matrix U is an upper triangular matrix;
calculating, by the computer system and for the embedding block, a step intensity $\Delta$ with Equation (1):

$$\Delta = 0.01 + RNUM \times a/16 \tag{1},$$

Wherein RNUM represents a number of the plurality of non-overlapping blocks in the embedding block, a is a coefficient in a range between 0.01 and 0.05;
determining, by the computer system and based on watermark information w, for the embedding block, modifying values $T_1$ and $T_2$ with Equations (2) and (3):

$$\text{if } w = 1, \ \begin{cases} T_1 = 0.5\Delta \\ T_2 = -1.5\Delta \end{cases}, \tag{2}$$

$$\text{if } w = 0, \ \begin{cases} T_1 = -0.5\Delta \\ T_2 = 1.5\Delta \end{cases}; \tag{3}$$

determining, by the computer system and for the embedding block, quantization results $C_1$ and $C_2$ with Equations (4) and (5):

$$C_1 = 2k\Delta + T_1 \tag{4}$$

$$C_1 = 2k\Delta + T_2 \tag{5},$$

wherein k=floor(ceil($U_{1,M}/\Delta$)/2) and $U_{1,M}$ is an matrix element in the first row and the M-th column of the matrix U, floor( ) gets the least nearest integer, and ceil( ) gets the largest nearest integer;

calculating, by the computer system and for the embedding block, an element $U_{1,M}'$ with Equation (6):

$$U_{1,M}' = \begin{cases} C_2, & \text{if } \text{abs}(U_{1,M} - C_2) < \text{abs}(U_{1,M} - C_1) \\ C_1, & \text{else} \end{cases} \quad (6)$$

wherein abs( ) gets an absolute value;

replacing, by the computer system and for the embedding block, $U_{1,M}$ with $U_{1,M}'$ in the matrix U to obtain a matrix U;

conducting, by the computer system and for the embedding block, an inverse LU operation to obtain a watermarked block A' with Equation (7)

$$A' = L \times U' \quad (7); \text{ and}$$

moving to next embedding block.

4. The method of claim 1, further comprising:
generating, by the computer system and for each component of the R, G, and B components of the host image, a random non-collision sequence that indicates order of embedding blocks that watermark information is embedded.

5. The method of claim 1, further comprising:
permuting, by the computer system, each component of the R, G, and B components for the watermark image using Arnold transformation with private keys.

6. The method of claim 1, wherein both the host image and the watermark image are 24-bit color images.

7. The method of claim 1, wherein M=8.

8. A method that is executed by a computer system to improve computational complexity when extracting a watermark image from a watermarked image to obtain the watermark image, wherein the watermarked image is a color image, and the watermark image is embedded into the watermarked image with LU decomposition, the method comprising:

dividing, by the computer system, the watermarked image into a Red (R) component, a Green (G) component, and a Blue (B) component;

dividing, by the computer system, each component of the R, G, and B components of the watermarked image into a plurality of M'×M' size blocks, wherein M' is a whole number greater than zero;

partitioning, by the computer system and for each component of the R, G, and B components of the watermarked image, each of the plurality of M'×M' size blocks into a plurality of non-overlapping blocks with adaptive rectangular partition;

selecting, by the computer system and for each component of the R, G, and B components of the watermarked image, a plurality of watermarked blocks from the plurality of M'×M' size blocks;

improving, by the computer system and for each component of the R, G, and B components of the watermarked image, the computational complexity by performing iteration steps that extract watermark information from the plurality of watermarked blocks to form a binary watermark sequence, the iteration steps including:

decomposing, by the computer system, a watermarked block with LU decomposition to obtain a matrix U' and a matrix L', wherein the matrix U' is an upper triangular matrix and the matrix L' is a lower triangular matrix;

extracting, by the computer system and for the watermarked block, watermark information from the matrix U'; and moving, by the computer system, to next watermarked block;

converting, by the computer system, each of three binary watermark sequences to obtain extracted component watermark images that correspond to R, G, and B components of the watermark image such that three extracted component watermark images are obtained; and obtaining, by the computer system, the watermark image by reconstructing the three extracted component watermark images such that the watermark image is extracted.

9. The method of claim 8, wherein the iteration steps further comprising:

calculating, by the computer system and for the watermarked block, a step intensity Δ' with equation (8):

$$\Delta' = 0.01 + RNUM' \times a'/16 \quad (8);$$

wherein RNUM' represents a number of the plurality of non-overlapping blocks in the watermarked block, a is coefficient in a range between 0.01 and 0.05;

determining, by the computer system and for the watermarked block, watermark information w' with equation (9):

$$w' = \text{mod}(\text{ceil}(U_{1,M'}'/\Delta), 2) \quad (9)$$

wherein mod( ) is the modulo operation, and ceil( ) gets the largest nearest integer, and $U_{1,M'}'$ is an element in the first row and the M'-th column of the matrix U' with column number of M'; and moving to next watermarked block.

10. The method of claim 8, further comprising:
dividing, by the computer system and for each component of R, G, and B components of the watermark image, the binary watermark sequence into a plurality of groups; and
converting, by the computer system, each group into a decimal pixel value.

11. The method of claim 8, further comprising:
conducting, by the computer system and based on private keys and for each component of R, G, and B components of the watermark image, an inverse Arnold transformation on each of the extracted component watermark images.

12. The method of claim 8, further comprising:
selecting, by the computer system, the watermarked blocks of the watermarked image based on a random non-collision sequence.

13. The method of claim 8, wherein both the watermarked image and the watermark image are 24-bit color images.

14. The method of claim 8, wherein M'=8.

15. A computer system that improves computational complexity with LU decomposition to embed a watermark image into a host image to generate a watermarked image, wherein both the host image and the watermark image are color images, the computer system comprising:

a processor;

a non-transitory computer-readable medium having stored therein instructions that when executed cause the processor to:

divide the watermark image into a Red (R) component, a Green (G) component, and a Blue (B) component;

convert, for each component of the R, G, and B components of the watermark image, each pixel value into a binary sequence to generate a plurality of binary sequences for each component of the R, G, and B components of the watermark image;

combine, for each component of the R, G, and B components of the watermark image, the plurality of binary sequences to form a component binary sequence such that three component binary sequences are formed that correspond to the R, G, and B components of the watermark image;

divide the host image into an R component, a G component, and a B component;

divide each component of the R, G, and B components of the host image into a plurality of M×M size blocks, wherein M is a whole number greater than zero;

partition, for each component of the R, G, and B components of the host image, each of the plurality of M×M size blocks into a plurality of non-overlapping blocks with adaptive rectangular partition;

select, for each component of the R, G, and B components of the host image, a plurality of embedding blocks from the plurality of M×M size blocks;

improve, for each component of the R, G, and B components of the host image, the computational complexity with the LU decomposition by performing iteration steps that embeds watermark information into the a plurality of embedding blocks until the a plurality of embedding blocks are converted into watermarked blocks such that a watermarked component image is formed that includes the watermarked blocks, obtain the watermarked image by reconstructing three watermarked component images that correspond to the R, G, and B components of the host image such that the watermark image is embedded into the host image to obtain the watermarked image.

16. The computer system of claim 15, wherein the instructions, when executed, further cause the processor to:

transform an original block matrix of an embedding block into a strictly G-diagonally dominant matrix;

decomposing the strictly G-diagonally dominant matrix of the embedding block with the LU decomposition to obtain a matrix L and a matrix U, wherein the matrix L is a lower triangular matrix and the matrix U is an upper triangular matrix;

embed, for the embedding block, watermark information into the matrix U;

conduct, for the embedding block, an inverse LU operation to obtain a watermarked block; and move to next embedding block.

17. The computer system of claim 15, wherein when the instructions cause the processor to perform iteration steps, the instructions further cause the processor to transform an original block matrix of an embedding block into a strictly G-diagonally dominant matrix A, wherein the strictly G-diagonally dominant matrix A is a M×M matrix;

decompose the strictly G-diagonally dominant matrix A of the embedding block with the LU decomposition to obtain a matrix L and a matrix U, wherein the matrix L is a lower triangular matrix and the matrix U is an upper triangular matrix;

calculate, for the embedding block, a step intensity $\Delta$ with equation (10):

$$\Delta = 0.01 + RNUM \times a/16 \tag{10}$$

Wherein RNUM represents a number of the plurality of non-overlapping blocks in the embedding block, a is a coefficient in a range between 0.01 and 0.05;

determine, based on watermark information w, for the embedding block, modifying values T1 and T2 with equations (11) and (12):

$$\text{if } w = 1, \quad \begin{cases} T_1 = 0.5\Delta \\ T_2 = -1.5\Delta \end{cases}, \tag{11}$$

$$\text{if } w = 0, \quad \begin{cases} T_1 = -0.5\Delta \\ T_2 = 1.5\Delta \end{cases}; \tag{12}$$

determine, for the embedding block, quantization results $C_1$ and $C_2$ with equations (13) and (14):

$$C_1 = 2k\Delta + T_1 \tag{13}$$

$$C_2 = 2k\Delta + T_2 \tag{14},$$

wherein $k = \text{floor}(\text{ceil}(U_{1,M}/\Delta)/2)$ and $U_{1,M}$ is an matrix element in the first row and the M-th column of the matrix U with M columns, floor( ) gets the least nearest integer, and ceil( ) gets the largest nearest integer;

calculate, for the embedding block, an element $U_{1,M}'$ with equation (15):

$$U_{1,M}' = \begin{cases} C_2, & \text{if } \text{abs}(U_{1,M} - C_2) < \text{abs}(U_{1,M} - C_1) \\ C_1, & \text{else} \end{cases}, \tag{15}$$

wherein abs( ) gets an absolute value;

replace, for the embedding block, $U_{1,M}$ with $U_{1,M}'$ in the matrix U to obtain a matrix U'; and conduct, for the embedding block, an inverse operation to obtain a watermarked block with equation (16)

$$A' = L \times U' \tag{16}.$$

18. The computer system of claim 15, wherein the instructions, when executed, further cause the processor to:

generate, for each component of the R, G, and B components of the host image, a random non-collision sequence that indicates order of embedding blocks that watermark information is to be embedded.

19. The computer system of claim 15, wherein the instructions, when executed, further cause the processor to:

permute each component of the R, G, and B components for the watermark image using Arnold transformation with private keys.

20. The computer system of claim 15, wherein M=8.

* * * * *